United States Patent
Lucero et al.

(10) Patent No.: US 10,936,069 B2
(45) Date of Patent: *Mar. 2, 2021

(54) METHOD AND APPARATUS FOR A TEXTURAL REPRESENTATION OF A GUIDANCE

(71) Applicant: Nokia Technologies Oy, Espoo (FI)

(72) Inventors: Andres Lucero, Tampere (FI); Akos Vetek, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 143 days.

This patent is subject to a terminal disclaimer.

(21) Appl. No.: 16/202,278

(22) Filed: Nov. 28, 2018

(65) Prior Publication Data

US 2019/0094954 A1   Mar. 28, 2019

Related U.S. Application Data

(63) Continuation of application No. 13/865,165, filed on Apr. 17, 2013, now Pat. No. 10,168,766.

(51) Int. Cl.
*G06F 3/00* (2006.01)
*G06F 3/01* (2006.01)
(Continued)

(52) U.S. Cl.
CPC ............... *G06F 3/016* (2013.01); *G06F 3/01* (2013.01); *G06F 3/041* (2013.01); *G06F 3/048* (2013.01);
(Continued)

(58) Field of Classification Search
CPC . G06F 3/01; G06F 3/016; G06F 3/041; G06F 3/0414; G06F 3/048; G06F 3/0481; G06F 3/0487; G06F 3/0488
See application file for complete search history.

(56) References Cited

U.S. PATENT DOCUMENTS 6,570,555 B1   5/2003   Prevost et al.
6,629,242 B2   9/2003   Kamiya et al.
(Continued)

FOREIGN PATENT DOCUMENTS

EP   1688877 A   8/2006
EP   1714447 A   10/2006
(Continued)

OTHER PUBLICATIONS

Bau, Olivier et al. "Revel: Tactile Feedback Technology of Augmented Reality" SIGGRAPH 2012 Conference Proceedings, Los Angeles, California, vol. 31, Issue 4, Article No. 89, Aug. 5-9, 2012, 1 page.

(Continued)

*Primary Examiner* — Kieu D Vu
*Assistant Examiner* — Andrew Chung
(74) *Attorney, Agent, or Firm* — Harrington & Smith

(57) ABSTRACT

A method comprising receiving an indication of a first input associated with an information item, determining that the first input corresponds with a first part of an invocation input associated with invocation of display of, at least part of, content associated with the information item, identifying a second part of the invocation input, the second part of the invocation input being immediately subsequent to the first part of the invocation input, and causing rendering, on a variable texture surface, of a textural representation of a guidance indicative of the second part is disclosed.

20 Claims, 21 Drawing Sheets

(51) Int. Cl.
*G06F 3/048* (2013.01)
*G06F 3/0487* (2013.01)
*G06F 3/0481* (2013.01)
*G06F 3/0488* (2013.01)
*G06F 3/041* (2006.01)

(52) U.S. Cl.
CPC .......... *G06F 3/0481* (2013.01); *G06F 3/0487* (2013.01); *G06F 3/0488* (2013.01)

(56) References Cited

U.S. PATENT DOCUMENTS

| | | | |
|---|---|---|---|
| 6,750,877 | B2 | 6/2004 | Rosenberg |
| 6,937,225 | B1 | 8/2005 | Kehlstadt et al. |
| 6,999,955 | B1 | 2/2006 | Horvitz |
| 7,088,234 | B2 | 8/2006 | Naito |
| 7,091,948 | B2 | 8/2006 | Chang |
| 7,155,729 | B1 | 12/2006 | Andrew |
| 7,383,517 | B2 | 6/2008 | Baudisch |
| 7,483,820 | B2 | 1/2009 | Yang |
| 7,631,968 | B1 | 12/2009 | Dobson |
| 8,013,837 | B1 | 9/2011 | Schroeder |
| 8,493,189 | B2 | 7/2013 | Suzuki |
| 8,957,847 | B1 | 2/2015 | Karakotsios |
| 9,041,520 | B2 | 5/2015 | Nakamura |
| 9,563,327 | B1 | 2/2017 | Pham |
| 2001/0030658 | A1 | 10/2001 | Rosenberg |
| 2002/0054117 | A1 | 5/2002 | Van Dantzich et al. |
| 2003/0025723 | A1 | 2/2003 | Olien |
| 2003/0046401 | A1 | 3/2003 | Abbott |
| 2003/0048305 | A1 | 3/2003 | Liang |
| 2003/0169151 | A1 | 9/2003 | Ebling |
| 2004/0037236 | A1 | 2/2004 | Massey et al. |
| 2004/0098462 | A1 | 5/2004 | Horvitz et al. |
| 2006/0047704 | A1 | 3/2006 | Gopalakrishnan |
| 2006/0053377 | A1 | 3/2006 | Newell et al. |
| 2006/0190823 | A1 | 8/2006 | Cunningham |
| 2006/0287901 | A1 | 12/2006 | Grad |
| 2006/0294036 | A1 | 12/2006 | Horvitz |
| 2007/0236450 | A1 | 10/2007 | Colgate et al. |
| 2008/0256484 | A1 | 10/2008 | Kraft |
| 2008/0288896 | A1 | 11/2008 | Madhvanath et al. |
| 2008/0316183 | A1 | 12/2008 | Westerman et al. |
| 2009/0167509 | A1 | 7/2009 | Fadell et al. |
| 2009/0172103 | A1 | 7/2009 | Tuli |
| 2009/0204927 | A1 | 8/2009 | Terasaki |
| 2009/0273575 | A1 | 11/2009 | Pryor |
| 2010/0149073 | A1 | 6/2010 | Chaum |
| 2010/0156818 | A1 | 6/2010 | Burrough |
| 2010/0231541 | A1 | 9/2010 | Cruz-Hernandez et al. |
| 2011/0004845 | A1 | 1/2011 | Ciabarra |
| 2011/0167350 | A1 | 7/2011 | Hoellwarth |
| 2011/0209104 | A1 | 8/2011 | Hinckley |
| 2011/0221669 | A1 | 9/2011 | Shams et al. |
| 2011/0260964 | A1 | 10/2011 | Mujkic |
| 2011/0264491 | A1* | 10/2011 | Birnbaum ............... G06F 9/451 705/14.4 |
| 2011/0285637 | A1* | 11/2011 | Karkkainen ............. G08B 6/00 345/173 |
| 2012/0056733 | A1 | 3/2012 | Ramsay et al. |
| 2012/0075168 | A1 | 3/2012 | Osterhout |
| 2012/0092383 | A1 | 4/2012 | Hysek |
| 2012/0096398 | A1 | 4/2012 | Greenspan et al. |
| 2012/0105475 | A1 | 5/2012 | Tseng |
| 2012/0212406 | A1 | 8/2012 | Osterhout et al. |
| 2012/0236037 | A1 | 9/2012 | Lessing et al. |
| 2012/0308972 | A1 | 12/2012 | Miller et al. |
| 2012/0327006 | A1 | 12/2012 | Israr et al. |
| 2013/0007665 | A1 | 1/2013 | Chaudhri et al. |
| 2013/0085345 | A1 | 4/2013 | Geisner et al. |
| 2013/0144709 | A1 | 6/2013 | Narasimhan |
| 2013/0205247 | A1 | 8/2013 | Erhard |
| 2013/0241847 | A1 | 9/2013 | Shaffer et al. |
| 2013/0305187 | A1 | 11/2013 | Phillips |
| 2013/0322665 | A1 | 12/2013 | Bennett et al. |
| 2013/0346515 | A1 | 12/2013 | DeLuca |
| 2014/0002376 | A1* | 1/2014 | Oliver ................. G06F 3/04883 345/173 |
| 2014/0055377 | A1 | 2/2014 | Kim |
| 2014/0075286 | A1 | 3/2014 | Harada |
| 2014/0101608 | A1 | 4/2014 | Ryskamp et al. |
| 2014/0139452 | A1* | 5/2014 | Levesque .............. G06F 3/0414 345/173 |
| 2014/0189592 | A1* | 7/2014 | Benchenaa ......... G06F 3/04886 715/835 |
| 2014/0223462 | A1 | 8/2014 | Aimone |
| 2014/0232637 | A1 | 8/2014 | Park |
| 2014/0267400 | A1 | 9/2014 | Mabbutt |
| 2014/0267911 | A1 | 9/2014 | Grant |
| 2014/0281954 | A1* | 9/2014 | Ullrich ................ G06F 3/04883 715/702 |
| 2014/0282233 | A1 | 9/2014 | Sandler |
| 2014/0292665 | A1 | 10/2014 | Lathrop |
| 2015/0097786 | A1* | 4/2015 | Behles ................ G06F 3/04883 345/173 |

FOREIGN PATENT DOCUMENTS

| | | |
|---|---|---|
| EP | 2474894 A | 7/2012 |
| JP | 2012064095 A | 3/2012 |
| WO | WO-2005071907 A | 8/2005 |
| WO | WO-2009012820 A1 | 1/2009 |
| WO | WO-2010112075 A | 10/2010 |
| WO | WO-2011115829 A1 | 9/2011 |

OTHER PUBLICATIONS

Brewster, Stephen, et al. "Tactile Feedback for Ambient Awareness in Mobile Interactions" Proceedings of the 24th British Computer Society Interaction Specialist Group Conference, Swinton, United Kingdom, 2010, pp. 412-417.

Chouvardas, Vasilios G. et al. "Tactile Displays: A Short Overview and Recent Developments" Proceedings of the ICTA, 2005, pp. 246-251.

Jin, Moon-Sub et al. "Interactive Mobile Augmented Reality System Using a Vibro-Tactile Pad" IEEE International Symposium on Virtual Reality Innovation, Singapore, Mar. 19-20, 2011, pp. 329-330.

Kern, Nicky et al. "Context-Aware Notification for Wearable Computing" Proceedings of the 7th IEEE International Symposium on Wearable Computers, 2003, pp. 223-230.

Knox, Stephen et al. "Scatterbox: Context-Aware Message Management," Revue d'Intelligence Artifcielle, vol. 22, No. 5, 2008, pp. 549-568.

Poupyrev, Ivan et al. "Ambient Touch: Designing Tactile Interfaces for Handheld Devices" Proceedings of the 15th Annual ACM Symposium on User Interfaces Software and Technology, Oct. 2002, pp. 51-60.

Simonite, Tom "Augmented Reality Meets Gesture Recognition," MIT's Technology Review, Sep. 26, 2011, 3 pages.

Starner, Thad et al. "Augmented Reality Through Wearable Computing" Presence: Teleoperators and Virtual Enviroments, vol. 6, No. 4, 1997, pp. 386-398.

Streefkerk, Jan Willem et al. "Context-Aware Notification for Mobile Police Officers" Engineering Psychology and Cognitive Ergonomics, 2007, pp. 436-445.

Velazquez, Ramiro, "Wearable Assistive Devices for the Blind" Wearable and Autonomous Biomedical Devices and Systems for Smart Enviroment: Issues and Characterization, 2010, pp. 331-349.

* cited by examiner

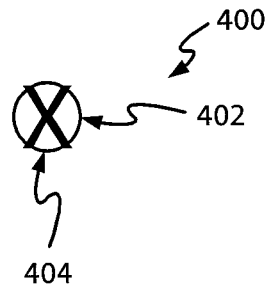
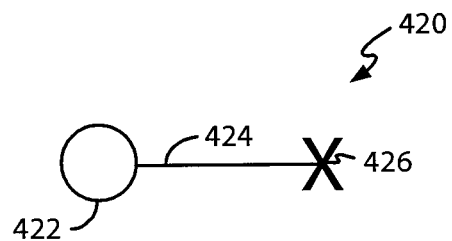
FIG. 4A    FIG. 4B
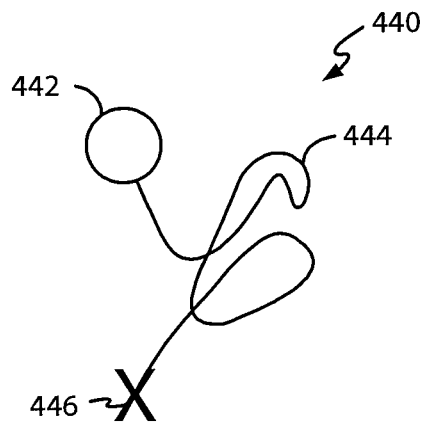
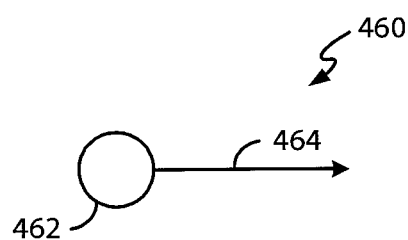
FIG. 4C    FIG. 4D
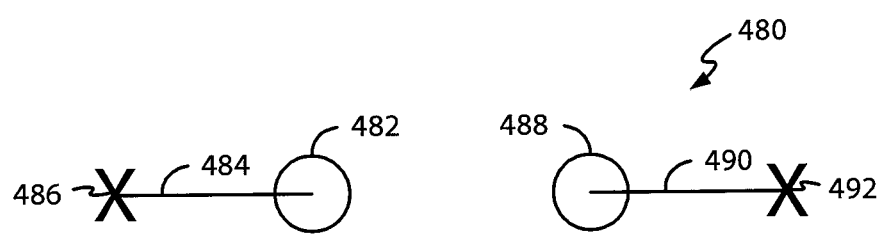
FIG. 4E

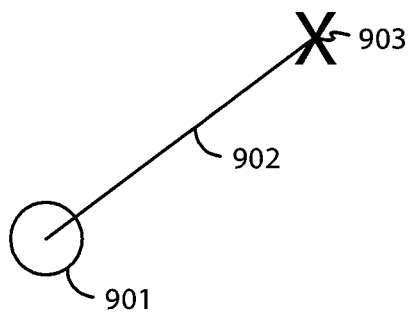
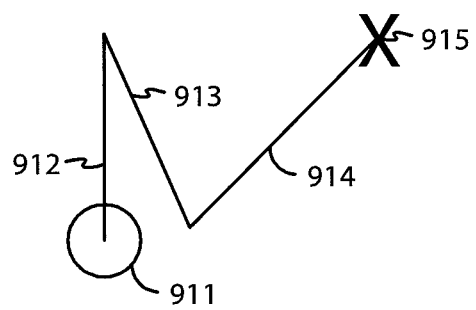
FIG. 9A　　　　　　　FIG. 9B
| Cognitive Load | Invocation Input |
|---|---|
| Cognitive Load Range 1001 | Invocation Input 1005 |
| Cognitive Load Range 1002 | Invocation Input 1006 |
| Cognitive Load Range 1003 | Invocation Input 1007 |
| Cognitive Load Range 1004 | Invocation Input 1008 |
FIG. 10

METHOD AND APPARATUS FOR A TEXTURAL REPRESENTATION OF A GUIDANCE

CROSS REFERENCE TO RELATED APPLICATION

This application is a continuation application of co-pending application Ser. No. 13/865,165 filed Apr. 17, 2013 with is hereby incorporated by reference in its entirety.

TECHNICAL FIELD

The present application relates generally to a textural representation of a guidance.

BACKGROUND

As electronic apparatuses play an increasing role in the lives of their users, it has become increasingly desirable to allow for interaction between the user and the electronic apparatus in a manner that allows the user to perform other actions safely and without undue distraction from the electronic apparatus. For example, it may be desirable for the input from the user to be appropriate to the utilization of the electronic apparatus and the action being performed by the user. In another example, it may be desirable for the information provided to the user to be appropriate to the utilization of the electronic apparatus and the action being performed by the user.

SUMMARY

Various aspects of examples of the invention are set out in the claims.

One or more embodiments may provide an apparatus, a computer readable medium, a non-transitory computer readable medium, a computer program product, and a method for receiving an indication of an invocation input associated with invocation of display of, at least part of, a notification content associated with a notification, determining at least one input aspect of the invocation input, determining an interaction preference based, at least in part, on the input aspect, and causing display of, at least part of, the notification content in compliance with the interaction preference.

One or more embodiments may provide an apparatus, a computer readable medium, a computer program product, and a non-transitory computer readable medium having means for receiving an indication of an invocation input associated with invocation of display of, at least part of, a notification content associated with a notification, means for determining at least one input aspect of the invocation input, means for determining an interaction preference based, at least in part, on the input aspect, and means for causing display of, at least part of, the notification content in compliance with the interaction preference.

In at least one example embodiment, the input aspect relates to at least one of: a movement speed, a force, a direction, or a number of contact inputs.

In at least one example embodiment, the interaction preference relates to at least one of: a duration associated with display of notification content, a speed associated with display of content, amount of notification content to be displayed, or an animation associated with display of content.

In at least one example embodiment, the duration associated with display of notification content relates to at least one of: a duration associated with retention of the notification content, a duration associated with introduction of the notification content, or a duration associated with removal of the notification content.

In at least one example embodiment, the speed associated with display of notification content relates to at least one of: a speed associated with introduction of the notification content, or a speed associated with removal of the notification content.

In at least one example embodiment, the animation associated with display of notification content relates to at least one of an animation associated with introduction of the notification content, or an animation associated with removal of the notification content.

In at least one example embodiment, causing display of the notification content comprises introduction of the notification content, retention of the notification content, removal of the notification content.

In at least one example embodiment, causing display of the notification content in compliance with the interaction preference relates to causing introduction of the notification content in compliance with the interaction preference.

In at least one example embodiment, causing display of the notification content in compliance with the interaction preference relates to causing retention of the notification content in compliance with the interaction preference.

In at least one example embodiment, causing display of the notification content in compliance with the interaction preference relates to causing removal of the notification content in compliance with the interaction preference.

In at least one example embodiment, determination of the interaction preference comprises determining, at least one, interaction preference aspect, wherein causing display of the notification content in compliance with the interaction preference comprises causing display of the notification content in compliance with the interaction preference aspect.

In at least one example embodiment, the interaction preference aspect corresponds with the input aspect.

One or more example embodiments further perform determining the interaction preference aspect to be directly proportional to the input aspect.

In at least one example embodiment, the input aspect relates to a duration of a movement input comprised by the invocation input, and wherein the interaction preference aspect relates to at least one of: an introduction of the notification content having a duration directly proportional to the duration of the movement input, retention of the notification content having a duration directly proportional to the duration of the movement input, or removal of the notification content having a duration directly proportional to the duration of the movement input.

In at least one example embodiment, the input aspect relates to a distance of a movement input comprised by the invocation input, and wherein the interaction preference aspect relates to at least one of: an introduction of the notification content having a duration directly proportional to the distance of the movement input, retention of the notification content having a duration directly proportional to the distance of the movement input, or removal of the notification content having a duration directly proportional to the distance of the movement input.

One or more example embodiments further perform determining the interaction preference aspect to be inversely proportional to the input aspect.

In at least one example embodiment, the input aspect relates to a speed of a movement input comprised by the invocation input, and wherein the interaction preference aspect relates to at least one of: an introduction of the notification content having a duration inversely proportional to the speed of the movement input, retention of the notification content having a duration inversely proportional to the speed of the movement input, removal of the notification content having a duration inversely proportional to the speed of the movement input.

In at least one example embodiment, the invocation input comprises an initiation part and a termination part.

In at least one example embodiment, the causation of display of the notification content in compliance with the interaction preference is performed after the termination part of the invocation input.

One or more example embodiments further perform determining an expressiveness preference based, at least in part, on the input aspect, wherein the interaction preference is based, at least in part, on the expressiveness preference.

In at least one example embodiment, the interaction preference relates to an animation associated with display of content, and wherein the animation is based at least in part on the expressiveness preference.

One or more example embodiments further perform determining an attentiveness level based, at least in part, on the input aspect, wherein the interaction preference is based, at least in part, on the attentiveness level.

In at least one example embodiment, amount of notification content to be displayed is based, at least in part on the attentiveness level.

In at least one example embodiment, the amount of notification content to be displayed is directly proportional to the attentiveness level.

In at least one example embodiment, causing display of the notification content in compliance with the interaction preference relates to a see through display, and the amount of notification content to be displayed is based, at least in part, on obscurance of display area associated with the see through display.

In at least one example embodiment, obscurance relates to causation of obscuring.

In at least one example embodiment, the see through display is a near eye display.

One or more example embodiments further perform determining a cognitive load of the notification content, wherein the interaction preference is based, at least in part, on the cognitive load.

One or more embodiments may provide an apparatus, a computer readable medium, a computer readable medium, a non-transitory computer readable medium, a computer program product, and a method for determining to provide a notification to a user, determining a textural representation of the notification based, at least in part, on notification content associated with the notification, and causing rendering of the textural representation of the notification on a variable texture surface.

One or more embodiments may provide an apparatus, a computer readable medium, a computer readable medium, a computer program product, and a non-transitory computer readable medium having means for determining to provide a notification to a user, means for determining a textural representation of the notification based, at least in part, on notification content associated with the notification, and causing rendering of the textural representation of the notification on a variable texture surface.

In at least one example embodiment, the notification content is absent information that designates a texture.

In at least one example embodiment, the variable texture surface is physically decoupled from a display upon which a visual representation of the notification is displayed.

In at least one example embodiment, the display is a see through display.

In at least one example embodiment, the see through display is a near eye display.

One or more example embodiments further perform determining at least one content classification associated with the notification content, wherein the textural representation of the notification is based, at least in part, on the content classification.

In at least one example embodiment, the textural representation of the notification is indicative of the content classification.

In at least one example embodiment, the content classification relates to a content perception classification.

In at least one example embodiment, the content perception classification relates to at least one of: text content, audio content, image content, or video content.

In at least one example embodiment, the content classification relates to a content delivery classification.

In at least one example embodiment, the content delivery classification relates to at least one of: a message, a phone call, or a broadcast.

In at least one example embodiment, the message relates to at least one of: an email, an instant message, or a text message.

In at least one example embodiment, the broadcast relates to at least one of: and information feed, a telecast, or a radiocast.

One or more example embodiments further perform determining a sender associated with the notification content, wherein the textural representation of the notification is based, at least in part on the sender.

In at least one example embodiment, the textural representation of the notification is indicative of the sender.

One or more example embodiments further perform determining a relationship between the user and the sender, wherein the textural representation of the notification is based, at least in part on the relationship.

In at least one example embodiment, the textural representation of the notification is indicative of the relationship.

One or more example embodiments further perform determining a cognitive load associated with the notification content, wherein the textural representation of the notification is based, at least in part, on the cognitive load.

In at least one example embodiment, a magnitude of the textural representation of the notification is directly proportional to a magnitude of the cognitive load.

In at least one example embodiment, a size of the textural representation of the notification is based, at least in part, on the cognitive load.

In at least one example embodiment, determining the textural representation of the notification relates to determining at least one of: a texture type, a texture magnitude, or a size, of the textural representation of the notification.

One or more example embodiments further perform determining a position of the textural representation of the notification, wherein the position of the textural representation of the notification relates to a position on the variable texture surface.

In at least one example embodiment, the position of the textural representation of the notification relates to a position of a selection point.

In at least one example embodiment, the selection point is visually unrepresented.

In at least one example embodiment, the position of the textural representation of the notification is based, at least in part, on a positional correlation between the variable texture surface and the selection point.

In at least one example embodiment, the position of the selection point correlates to a fixed position of the variable texture surface.

In at least one example embodiment, the fixed position of the variable texture surface is a geometric center of the variable texture surface.

In at least one example embodiment, the variable texture surface corresponds with a touch sensor, wherein the position of the selection point is based, at least in part, on touch sensor information received from the touch sensor.

In at least one example embodiment, the touch sensor information is indicative of selection point movement.

In at least one example embodiment, the position of the selection point is based, at least in part, on gaze tracking information.

In at least one example embodiment, determining to provide a notification comprises receiving an indication of content, and determining to provide a notification to the user that signifies the content.

One or more embodiments may provide an apparatus, a computer readable medium, a computer readable medium, a non-transitory computer readable medium, a computer program product, and a method for receiving an indication of a first input associated with an information item, determining that the first input corresponds with a first part of an invocation input associated with invocation of display of, at least part of, content associated with the information item, identifying a second part of the invocation input, the second part of the invocation input being immediately subsequent to the first part of the invocation input, and causing rendering, on a variable texture surface, of a textural representation of a guidance indicative of the second part.

One or more embodiments may provide an apparatus, a computer readable medium, a computer readable medium, a computer program product, and a non-transitory computer readable medium having means for receiving an indication of a first input associated with an information item, determining that the first input corresponds with a first part of an invocation input associated with invocation of display of, at least part of, content associated with the information item, identifying a second part of the invocation input, the second part of the invocation input being immediately subsequent to the first part of the invocation input, and causing rendering, on a variable texture surface, of a textural representation of a guidance indicative of the second part.

One or more example embodiments further perform receiving an indication of a second input that corresponds with the second part, and causing display of, at least part of, the content based, at least in part, on determination that the second input corresponds with the second part.

In at least one example embodiment, the second part relates to a movement input and the guidance is indicative of the movement input.

In at least one example embodiment, the guidance relates to a direction of the movement input.

In at least one example embodiment, the textural representation of the guidance relates to a texture that is communicative of a preference for the movement input.

In at least one example embodiment, the textural representation of the guidance relates to less textural resistance in a direction that complies with the second part than the textural resistance in a direction that fails to comply with the second part.

In at least one example embodiment, the textural representation of the guidance being indicative of a direction that complies with the second part relates to being indicative of animal fur being stroked along the lay of the fur.

In at least one example embodiment, the textural representation of the guidance being indicative of a direction that fails to comply with the second part relates to being indicative of animal fur being stroked in opposition to the lay of the fur.

In at least one example embodiment, the textural resistance relates to friction associated with the textural representation of the guidance.

In at least one example embodiment, the textural representation of the guidance relates to a texture that is communicative of a difference between the movement input and a movement of the second input.

One or more example embodiments further perform receiving an indication of a direction associated with, at least part of, the second input, determining the textural representation of the guidance based, at least in part, on a difference between a direction of the second input and the direction associated with the second input.

One or more example embodiments further perform receiving an indication that the direction of, at least part of, the second input becomes compliant with the second part, and reducing textural resistance of the textural representation of the guidance based, at least in part, on the direction.

One or more example embodiments further perform receiving an indication that the direction of, at least part of, the second input becomes non-compliant with the second part, and increasing textural resistance of the textural representation of the guidance based, at least in part, on the direction.

In at least one example embodiment, the textural representation of the guidance relates to a textural path on the variable texture surface.

In at least one example embodiment, the textural path corresponds to a lesser textural resistance along the textural path than the textural resistance outside of the textural path.

In at least one example embodiment, the textural path corresponds to a greater textural resistance along the textural path than the textural resistance outside of the textural path.

In at least one example embodiment, the second part relates to a force input, and the guidance is indicative of the force input.

In at least one example embodiment, the textural representation of the guidance relates to a texture that is communicative of a preference for the force input.

In at least one example embodiment, the textural representation of the guidance relates to less textural resistance to indicate a lesser force input than the textural resistance of a greater force.

In at least one example embodiment, the textural representation of the guidance relates to greater textural resistance to indicate a lesser force input than the textural resistance of a greater force.

In at least one example embodiment, the textural representation of the guidance relates to a texture that is communicative of a difference between the force input and a force of the second input.

One or more example embodiments further perform receiving an indication of force associated with, at least part of, the second input, and determining the textural representation of guidance based, at least in part, on a difference between a force of the second input and the force input.

One or more example embodiments further perform receiving an indication that a force of, at least part of, the second input becomes less than the force input, and reducing textural depth of the textural representation of the guidance based, at least in part, on the force of the second input and the force input.

One or more example embodiments further perform receiving an indication that a force of, at least part of, the second input becomes greater than the second part, and increasing textural depth of the textural representation of the guidance based, at least in part, on the force of the second input and the force input.

In at least one example embodiment, the first input and second input relate to a touch input.

In at least one example embodiment, the information item is a notification, and the content is notification content.

In at least one example embodiment, the first input relates to an initiation part of an input.

In at least one example embodiment, the invocation input is indicative of a cognitive load associated with the content.

In at least one example embodiment, the variable texture surface is physically decoupled from a display upon which a visual representation of the notification is displayed.

In at least one example embodiment, the display is a see through display.

In at least one example embodiment, the see through display is a near eye display.

One or more embodiments may provide an apparatus, a computer readable medium, a computer readable medium, a non-transitory computer readable medium, a computer program product, and a method for determining to provide a notification to a user, the notification being associated with notification content, determining a cognitive load associated with the notification content, determining a notification representation associated with the notification such that the notification representation is indicative of the cognitive load.

One or more embodiments may provide an apparatus, a computer readable medium, a computer readable medium, a computer program product, and a non-transitory computer readable medium having means for determining to provide a notification to a user, the notification being associated with notification content, means for determining a cognitive load associated with the notification content, means for determining a notification representation associated with the notification such that the notification representation is indicative of the cognitive load.

In at least one example embodiment, an opacity of the notification representation is indicative of the cognitive load.

In at least one example embodiment, the opacity is inversely proportional to the cognitive load.

In at least one example embodiment, a brightness of the notification representation is indicative of the cognitive load.

In at least one example embodiment, the brightness is directly proportional to the cognitive load.

In at least one example embodiment, a size of the notification representation is indicative of the cognitive load.

In at least one example embodiment, the size is directly proportional to the cognitive load.

In at least one example embodiment, a movement of the notification representation is indicative of the cognitive load.

In at least one example embodiment, a speed of the movement is indicative of the cognitive load.

In at least one example embodiment, the speed is inversely proportional to the cognitive load.

In at least one example embodiment, the movement relates to a movement pattern.

In at least one example embodiment, the movement pattern is indicative of a weight being carried.

In at least one example embodiment, the weight is directly proportional to the cognitive load.

In at least one example embodiment, the movement pattern is indicative of the weight being carried by a flying entity.

In at least one example embodiment, a shape of the notification representation is indicative of the flying entity.

One or more example embodiments further perform causing display of the notification representation on a display.

In at least one example embodiment, the display relates to a see through display, and cognitive load is based, at least in part, on obscurance of display area associated with the see through display.

In at least one example embodiment, the see through display is a near eye display.

In at least one example embodiment, a texture associated with the notification representation is indicative of the cognitive load.

In at least one example embodiment, determining to provide a notification comprises receiving an indication of content, and determining to provide a notification to the user that signifies the content.

In at least one example embodiment, the cognitive load is a value that reflects an amount of cognitive work associated with the user understanding the notification content.

In at least one example embodiment, a low cognitive load is indicative of notification content that is easier for the user to understand than notification content indicated by a high cognitive load.

In at least one example embodiment, cognitive load is indicative of visual distraction associated with visual representation of the notification content.

In at least one example embodiment, a low cognitive load is indicative of notification content that is less visually distracting than notification content indicated by a high cognitive load.

In at least one example embodiment, the cognitive load is based, at least in part, on amount of notification content.

In at least one example embodiment, the cognitive load is based, at least in part on a content classification associated with the notification content.

In at least one example embodiment, the content classification relates to a content perception classification.

In at least one example embodiment, the content perception classification relates to at least one of: text content, audio content, image content, or video content.

In at least one example embodiment, the content classification relates to a content delivery classification.

In at least one example embodiment, the content delivery classification relates to at least one of: a message, a phone call, or a broadcast.

One or more example embodiments further perform determining a sender associated with the notification, wherein the cognitive load is based, at least in part on the sender.

One or more example embodiments further perform determining a relationship between the user and the sender, wherein the cognitive load is based, at least in part on the relationship.

In at least one example embodiment, the relationship is indicative of a social distance between the user and the sender, and wherein the cognitive load is based, at least in part on the social distance.

One or more embodiments may provide an apparatus, a computer readable medium, a computer readable medium, a non-transitory computer readable medium, a computer program product, and a method for determining to provide a notification to a user, the notification being associated with notification content, determining a cognitive load associated with the notification content, and determining an invocation input associated with the notification based, at least in part on the cognitive load.

One or more embodiments may provide an apparatus, a computer readable medium, a computer readable medium, a computer program product, and a non-transitory computer readable medium having means for determining to provide a notification to a user, the notification being associated with notification content, means for determining a cognitive load associated with the notification content, and means for determining an invocation input associated with the notification based, at least in part on the cognitive load.

In at least one example embodiment, a complexity of the invocation input is directly proportional to the cognitive load.

In at least one example embodiment, the complexity of the invocation input relates to a number of parts comprised by the invocation input.

In at least one example embodiment, the complexity of the invocation input relates to a diversity of parts comprised by the invocation input.

In at least one example embodiment, the diversity of parts relates to a number of different input classifications comprised by the invocation input.

In at least one example embodiment, duration of one or more parts of the invocation input is directly proportional to the cognitive load.

In at least one example embodiment, the invocation input comprises a movement part.

In at least one example embodiment, the movement part is associated with a distance that is directly proportional to the cognitive load.

In at least one example embodiment, the movement part corresponds with, at least part of, a movement of the notification representation.

In at least one example embodiment, the movement part comprises a plurality of movement parts to be performed in a designated sequence.

In at least one example embodiment, a number of movement parts comprised by the invocation input is directly proportional to the cognitive load.

In at least one example embodiment, the invocation input is associated with a cognitive burden to the user, the cognitive burden being proportional to the cognitive load.

In at least one example embodiment, the cognitive burden relates to an attentiveness level.

In at least one example embodiment, attentiveness level relates to a threshold value indicative of a user's cognitive ability to perceive notification content indicated by the cognitive load.

In at least one example embodiment, the invocation input comprises, at least, an initiation part and a termination part.

In at least one example embodiment, determining the invocation input comprises determining that the cognitive load is in a cognitive load range associated with a predetermined invocation input.

One or more example embodiments further perform receiving an indication of an input associated with the notification, and causing display of, at least part of, the notification content based, at least in part, on determination that the input corresponds with the invocation input.

In at least one example embodiment, causing display of the notification content relates to a see through display.

In at least one example embodiment, the see through display is a near eye display.

In at least one example embodiment, determining to provide a notification comprises receiving an indication of content, and determining to provide a notification to the user that signifies the content.

In at least one example embodiment, the cognitive load is a value that reflects an amount of cognitive work associated with the user understanding the notification content.

In at least one example embodiment, a low cognitive load is indicative of notification content that is easier for the user to understand than notification content indicated by a high cognitive load.

In at least one example embodiment, the cognitive load is indicative of visual distraction associated with visual representation of the notification content.

In at least one example embodiment, a low cognitive load is indicative of notification content that is less visually distracting than notification content indicated by a high cognitive load.

In at least one example embodiment, the cognitive load is based, at least in part, on amount of notification content.

In at least one example embodiment, the cognitive load is based, at least in part on a content classification associated with the notification content.

In at least one example embodiment, the content classification relates to a content perception classification.

In at least one example embodiment, the content perception classification relates to at least one of: text content, audio content, image content, or video content.

In at least one example embodiment, the content classification relates to a content delivery classification.

In at least one example embodiment, the content delivery classification relates to at least one of: a message, a phone call, or a broadcast.

One or more example embodiments further perform determining a sender associated with the notification, wherein the cognitive load is based, at least in part on the sender.

One or more example embodiments further perform determining a relationship between the user and the sender, wherein the cognitive load is based, at least in part on the relationship.

In at least one example embodiment, the relationship is indicative of a social distance between the user and the sender, and wherein the cognitive load is based, at least in part on the social distance.

BRIEF DESCRIPTION OF THE DRAWINGS

For a more complete understanding of embodiments of the invention, reference is now made to the following descriptions taken in connection with the accompanying drawings in which:

FIGS. 4A-4E are diagrams illustrating touch inputs according to at least one example embodiment;

FIGS. 9A-9B are diagrams illustrating invocation inputs according to at least one example embodiment;

FIG. 10 is a diagram illustrating an invocation input in relation to a cognitive load range according to at least one example embodiment;

DETAILED DESCRIPTION OF THE DRAWINGS

Figure 1:
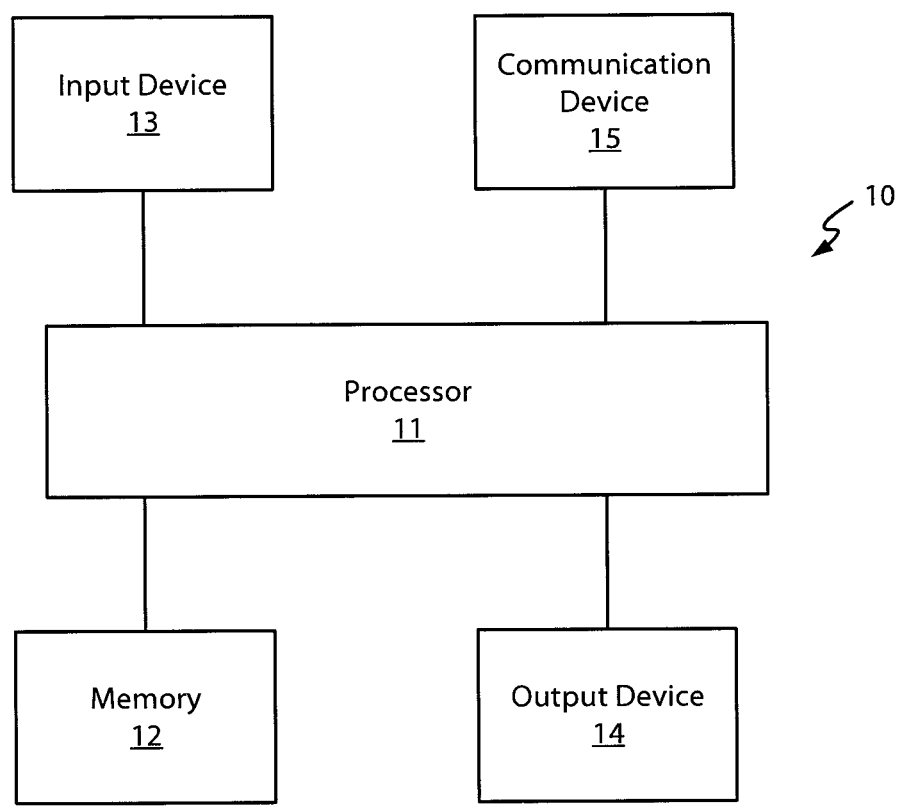
FIG. 1 is a block diagram showing an apparatus, such as an electronic apparatus 10, according to an example embodiment.

An embodiment of the invention and its potential advantages are understood by referring to FIGS. 1 through 30 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a portable digital assistant (PDAs), a pager, a mobile computer, a desktop computer, a television, a gaming apparatus, a laptop computer, a media player, a camera, a video recorder, a mobile phone, a global positioning system (GPS) apparatus, and/or any other types of electronic systems. Moreover, the apparatus of at least one example embodiment need not be the entire electronic apparatus, but may be a component or group of components of the electronic apparatus in other example embodiments.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for-performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output Device 14 may comprise a visual output device, such as a display, a light, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques; and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2A:
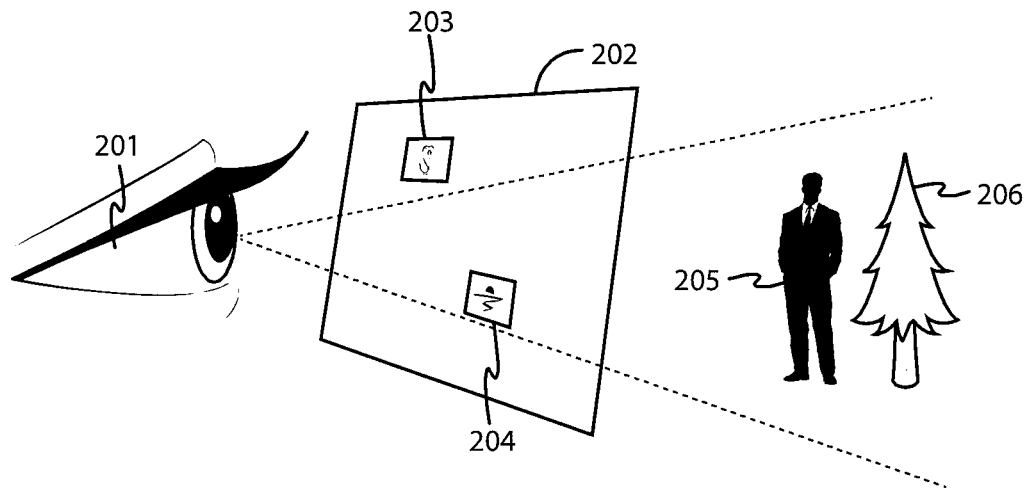
FIGS. 2A-2B are diagrams illustrating see through displays according to at least one example embodiment.
Figure 2B:
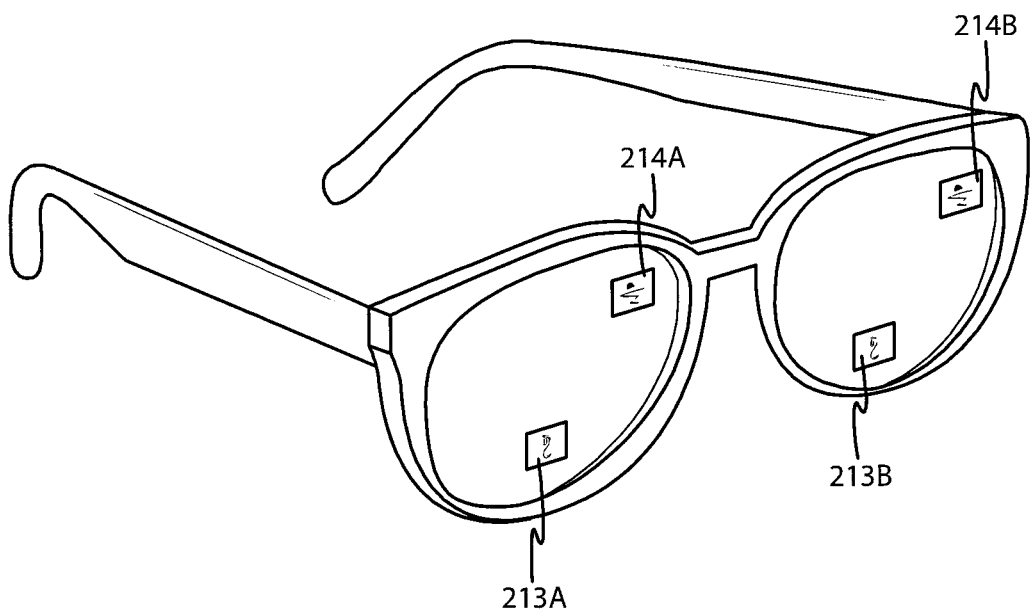

FIGS. 2A-2B are diagrams illustrating see through displays according to at least one example embodiment. The examples of FIGS. 2A-2B are merely examples of see through displays, and do not limit the scope of the claims. For example, configuration of the see through display may vary, relationship between the user and the see through display may vary, shape of the see through display may vary, opacity of the see through display may vary, and/or the like.

In some circumstances, it may be desirable for a display to be a see through display. In at least one example embodiment, a see through display relates to a display that presents information to a user, but through which objects on an opposite side of the display from the user may be seen. A see through display may be comprised by a window, a windshield, a visor, glasses, and/or the like.

FIG. 2A is a diagram illustrating see through display 202 according to at least one example embodiment. In at least one example embodiment, displaying information on a see through display so that the information corresponds with one or more objects viewable through the see through display is referred to as augmented reality. In the example of FIG. 2A, user 201 may perceive objects 205 and 206 through see through display 202. In at least one example embodiment, the see through display may display information to the user. For example, display 202 may display information 203 and information 204. Information 203 and information 204 may be positioned on display 202 such that the information corresponds with one or more objects viewable through see through display 202, such as object 205. In such an example, information 203 may relate to object 205. For example, information 203 may indicate an identity of object 205.

In some circumstances, information displayed on a see through display may obscure one or more objects from the user when perceived through the see through display. In at least one example embodiment, obscurance relates to causation of obscuring. For example, display of information 203 on display 202 may cause obscurance of the display area of display 202 associated with information 203. In this manner, information 203 may be associated with obscurance of a display area associated with the see through display.

FIG. 2B is a diagram illustrating a see through display according to at least one example embodiment. In at least one example embodiment, a see through display is a near eye display. A near eye display may relate to a see through display that is positioned proximate to an eye of the user. The example of FIG. 2B illustrates glasses that comprise a near eye display in each lens. In the example of FIG. 2B, the right near eye display is displaying information 213A and 214A, and the left near eye display is displaying information 213B and 214B. In at least one example embodiment, information 213A may be related to information 213B. For example, the content of information 213A may be identical to content of information 213B. In some circumstances, even though the content may be identical between 213A and 213B, position of information 213A on the right near eye display may vary from position of information 213B on the left near eye display. In this manner, the apparatus may vary position of information between the left near eye display and right near eye display to vary the parallax of the information perceived by the user. In this manner, the apparatus may vary the perceived depth of the information by the user.

FIGS. 3A-3D are diagrams illustrating variable texture surfaces according to at least one example embodiment. The examples of FIGS. 3A-3D are merely examples of variable texture surfaces, and do not limit the scope of the claims. For example, physical design may vary, electrical characteristics may vary, excitation of the user's senses may vary, and/or the like.

As user interfaces become more comprehensive, the senses that a user utilizes when interacting with an apparatus have grown. In at least one example embodiment, the apparatus provides a textural representation of information to the user. In at least one example embodiment, a textural representation of information relates to a texture that is indicative of the information being represented. For example, a textural representation of a surface of glass may relate to a smooth texture and a textural representation of a surface of a rock may be rough. In at least one example embodiment, an apparatus conveys the textural representation by way of a variable texture surface. In at least one example embodiment, the apparatus enables user perception of the textural representation by causing rendering of the textural representation on the variable texture surface. The apparatus may cause rendering by actuating the variable texture surface in as governed by the textural representation, may cause rendering by sending the textural representation to another apparatus that performs the rendering, and/or the like.

In at least one example embodiment, a variable texture surface relates to an output device that is configured to convey a controllably varying texture to a user. A variable texture surface may convey texture to a user by way of varying pressure, vibration, electric field, temperature, and/or the like. For example, a variable texture surface may relate to surfaces that undergo a mechanical action to provide the user with experience of the texture. In another example, a variable texture surface may relate to activation of the nerves of the user by way of varying an electric field. In still another example, a variable texture surface may relate to a vibro-tactile simulation that mimics a texture. In at least one example embodiment, an apparatus combines more than one variable texture surface. For example, the apparatus may use both an electric field and temperature. In such an example, the apparatus may use temperature to vary the perception of texture of the user beyond the textures available to electric field alone. In this manner, combination of different types of variable texture surfaces in conjunction with each other may allow for a wider variety of available textural representations for conveying information to the user.

In at least one example embodiment, a textural representation is indicative of a textural resistance. In at least one example embodiment, textural resistance relates to a textural property that causes the user to perceive a resistance to movement along a variable texture surface. For example, textural resistance may relate to a representation of friction associated with the textural representation. For example, a high level of textural resistance may relate to a user perceiving a high level of friction.

Figures 3A, 3B:
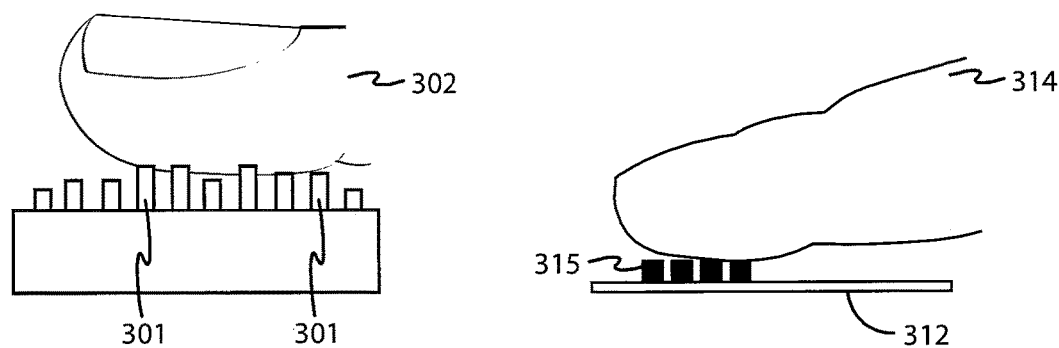
FIGS. 3A-3D are diagrams illustrating variable texture surfaces according to at least one example embodiment.

FIG. 3A is a diagram illustrating a variable texture surface according to at least one example embodiment. In the example of FIG. 3A, the variable texture surface renders the textural representation by way of controlling an array of pins 301 that are arranged on the variable texture surface such that, when sensed by the user, for example by way of finger 302, the user may perceive the textural representation. In at least one example embodiment, the apparatus causes rendering of the textural representation by determining whether to actuate one or more pins 301, to what magnitude to actuate one or more pins 301, and or the like. In at least one example embodiment, the actuation of the pin 301 may be indicative of a textural representation. For example, movement or vibration of the pin 301 may be used to convey different aspects relating to a textural representation, such as movement beneath the touch of the user. The apparatus may actuate pins 301 by way of a piezoelectric device, an electrically controlled pneumatic valve, an electromagnetic force, and/or the like.

FIG. 3B is a diagram illustrating a variable texture surface according to at least one example embodiment. In the example of FIG. 3B, the variable texture surface renders the textural representation by way of electro-tactile stimulus of nerve fibers within the skin of the user. In this manner, the variable texture surface of FIG. 3B may render a textural representation independent of mechanical actuation. The variable texture surface of FIG. 3B comprises electrodes 315 arranged on 312. The apparatus may provide signals, such as anodic and cathodic pulses, to electrodes 315 to stimulate cells in the skin of the user so that the user experiences the textural representation.

Figures 3C, 3D:
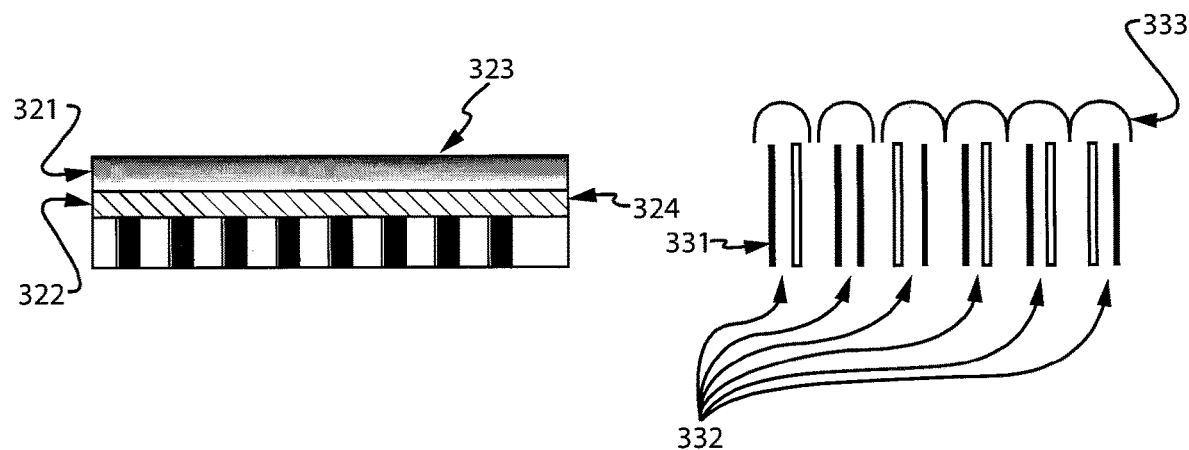

FIGS. 3C and 3D are diagrams illustrating variable texture surfaces according to at least one example embodiment. In the example of FIG. 3C, the variable texture surface renders the textural representation by way of rheological fluid manipulation. In at least one example embodiment, the rheological fluid relates to a magnetorheological fluid, an electrorheological fluid, and/or the like.

In at least one example embodiment, a magnetorheological fluid relates to a fluid having a viscosity that may be varied by varying an electromagnetic field to which the magnetorheological fluid is exposed. In at least one example embodiment, a magnetorheological fluid relates to a suspension of micron sized ferromagnetic particles dispersed in a non-ferromagnetic fluid. The viscosity of the magnetorheological fluid may be increased in direct proportion to a magnetic field.

In at least one example embodiment, an electrorheological fluid relates to a fluid having a viscosity that may be varied by varying an electric field to which the electrorheological fluid is exposed. In at least one example embodiment, an electrorheological fluid relates to a suspension of dielectric solids or polymeric particles in an insulating base oil. The viscosity of the electrorheological fluid may be increased in direct proportion to an electric field.

In the example of FIG. 3C, the variable texture surface relates to a surface for which compressibility may be varied. In the example of FIG. 3C, rheological fluid 321 is enclosed by conductive membrane 323 and limiting mesh 324. It may be desirable for conductive membrane 323 to be conductive so that electromagnetic fields may be suppressed beyond the variable texture surface. The limiting mesh may contain the rheological fluid, while allowing electromagnetic field to pass through. The variable texture surface of FIG. 3C comprises an excitation array 322. Excitation array 322 may relate to an array of elements that may produce an electric field through the rheological fluid, a magnetic field through the rheological fluid, and/or the like. The apparatus may vary the signal from an element in the excitation array so that compressibility of the surface above the element may vary in accordance with the signal.

In the example of FIG. 3D, the variable texture surface relates to a surface for which depth of the surface may be varied. The variable texture surface of FIG. 3D relates to an array of valve electrodes 331 which control viscosity of an electrorheological fluid between the electrodes. In the example of FIG. 3D, elastomeric membrane 333 is configured to provide and array of chambers that correspond with the array of valve electrodes 331. In this manner, depth and/or viscosity of the chamber may be varied in proportion to a signal provided to a valve electrode.

FIGS. 4A-4E are diagrams illustrating touch inputs according to at least one example embodiment. The examples of FIGS. 4A-4E are merely examples of touch inputs, and do not limit the scope of the claims. For example, number of inputs may vary, relationship between inputs may vary, orientation of inputs may vary, and/or the like.

In FIGS. 4A-4E, a circle represents an input related to contact with a touch display, two crossed lines represent an input related to releasing a contact from a touch display, and a line represents input related to movement on a touch display. Although the examples of FIGS. 4A-4E indicate continuous contact with a touch display, there may be a part of the input that fails to make direct contact with the touch display. Under such circumstances, the apparatus may, nonetheless, determine that the input is a continuous stroke input. For example, the apparatus may utilize proximity information, for example information relating to nearness of an input implement to the touch display, to determine part of a touch input.

In the example of FIG. 4A, input 400 relates to receiving contact input 402 and receiving a release input 404. In this example, contact input 402 and release input 404 occur at the same position. In an example embodiment, an apparatus utilizes the time between receiving contact input 402 and release input 404. For example, the apparatus may interpret input 400 as a tap for a short time between contact input 402 and release input 404, as a press for a longer time between contact input 402 and release input 404, and/or the like.

In the example of FIG. 4B, input 420 relates to receiving contact input 422, a movement input 424, and a release input 426. Input 420 relates to a continuous stroke input. In this example, contact input 422 and release input 426 occur at different positions. Input 420 may relate to dragging an object from one position to another, to moving a scroll bar, to panning a virtual screen, to drawing a shape, and/or the like. In an example embodiment, an apparatus interprets input 420 based at least in part on the speed of movement 424. For example, if input 420 relates to panning a virtual screen, the panning motion may be small for a slow movement, large for a fast movement, and/or the like. In another example embodiment, an apparatus interprets input 420 based at least in part on the distance between contact input 422 and release input 426. For example, if input 420 relates to a scaling operation, such as resizing a box, the scaling may relate to the distance between contact input 422 and release input 426. An apparatus may interpret the input before receiving release input 426. For example, the apparatus may evaluate a change in the input, such as speed, position, and/or the like. In such an example, the apparatus may perform one or more determinations based upon the change in the touch input. In such an example, the apparatus may modify a text selection point based at least in part on the change in the touch input.

In the example of FIG. 4C, input 440 relates to receiving contact input 442, a movement input 444, and a release input 446 as shown. Input 440 relates to a continuous stroke input. In this example, contact input 442 and release input 446 occur at different positions. Input 440 may relate to dragging an object from one position to another, to moving a scroll bar, to panning a virtual screen, to drawing a shape, and/or the like. In an example embodiment, an apparatus interprets input 440 based at least in part on the speed of movement 444. For example, if input 440 relates to panning a virtual screen, the panning motion may be small for a slow movement, large for a fast movement, and/or the like. In another example embodiment, an apparatus interprets input 440 based at least in part on the distance between contact input 442 and release input 446. For example, if input 440 relates to a scaling operation, such as resizing a box, the scaling may relate to the distance between contact input 442 and release input 446. In still another example embodiment, the apparatus interprets the position of the release input. In such an example, the apparatus may modify a text selection point based at least in part on the change in the touch input.

In the example of FIG. 4D, input 460 relates to receiving contact input 462, and a movement input 464, where contact is released during movement. Input 460 relates to a continuous stroke input. Input 460 may relate to dragging an object from one position to another, to moving a scroll bar, to panning a virtual screen, to drawing a shape, and/or the like. In an example embodiment, an apparatus interprets input 460 based at least in part on the speed of movement 464. For example, if input 460 relates to panning a virtual screen, the panning motion may be small for a slow movement, large for a fast movement, and/or the like. In another example embodiment, an apparatus interprets input 460 based at least in part on the distance associated with the movement input 464. For example, if input 460 relates to a scaling operation, such as resizing a box, the scaling may relate to the distance of the movement input 464 from the contact input 462 to the release of contact during movement.

In an example embodiment, an apparatus may receive multiple touch inputs at coinciding times. For example, there may be a tap input at a position and a different tap input at a different location during the same time. In another example there may be a tap input at a position and a drag input at a different position. An apparatus may interpret the multiple touch inputs separately, together, and/or a combination thereof. For example, an apparatus may interpret the multiple touch inputs in relation to each other, such as the distance between them, the speed of movement with respect to each other, and/or the like.

In the example of FIG. 4E, input 480 relates to receiving contact inputs 482 and 488, movement inputs 484 and 490, and release inputs 486 and 492. Input 420 relates to two continuous stroke inputs. In this example, contact input 482 and 488, and release input 486 and 492 occur at different positions. Input 480 may be characterized as a multiple touch input. Input 480 may relate to dragging an object from one position to another, to moving a scroll bar, to panning a virtual screen, to drawing a shape, to indicating one or more user selected text positions and/or the like. In an example embodiment, an apparatus interprets input 480 based at least in part on the speed of movements 484 and 490. For example, if input 480 relates to zooming a virtual screen, the zooming motion may be small for a slow movement, large for a fast movement, and/or the like. In another example embodiment, an apparatus interprets input 480 based at least in part on the distance between contact inputs 482 and 488 and release inputs 486 and 492. For example, if input 480 relates to a scaling operation, such as resizing a box, the scaling may relate to the collective distance between contact inputs 482 and 488 and release inputs 486 and 492.

In an example embodiment, the timing associated with the apparatus receiving contact inputs 482 and 488, movement inputs 484 and 490, and release inputs 486 and 492 varies. For example, the apparatus may receive contact input 482 before contact input 488, after contact input 488, concurrent to contact input 488, and/or the like. The apparatus may or may not utilize the related timing associated with the receiving of the inputs. For example, the apparatus may utilize an input received first by associating the input with a preferential status, such as a primary selection point, a starting position, and/or the like. In another example, the apparatus may utilize non-concurrent inputs as if the apparatus received the inputs concurrently. In such an example, the apparatus may utilize a release input received first the same way that the apparatus would utilize the same input if the apparatus had received the input second.

Even though an aspect related to two touch inputs may differ, such as the direction of movement, the speed of movement, the position of contact input, the position of release input, and/or the like, the touch inputs may be similar. For example, a first touch input comprising a contact input, a movement input, and a release input, may be similar to a second touch input comprising a contact input, a movement input, and a release input, even though they may differ in the position of the contact input, and the position of the release input.

Figure 5A:
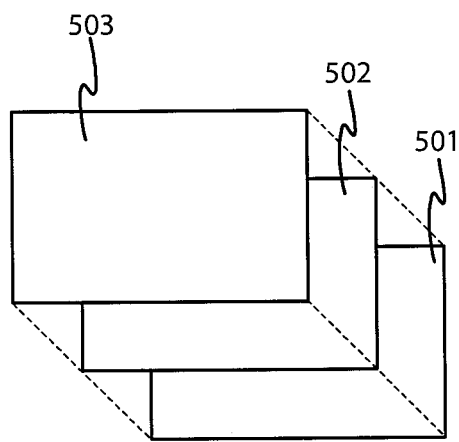
FIGS. 5A-5B are diagrams illustrating variable texture surfaces in relation to sensors according to at least one example embodiment.
Figure 5B:
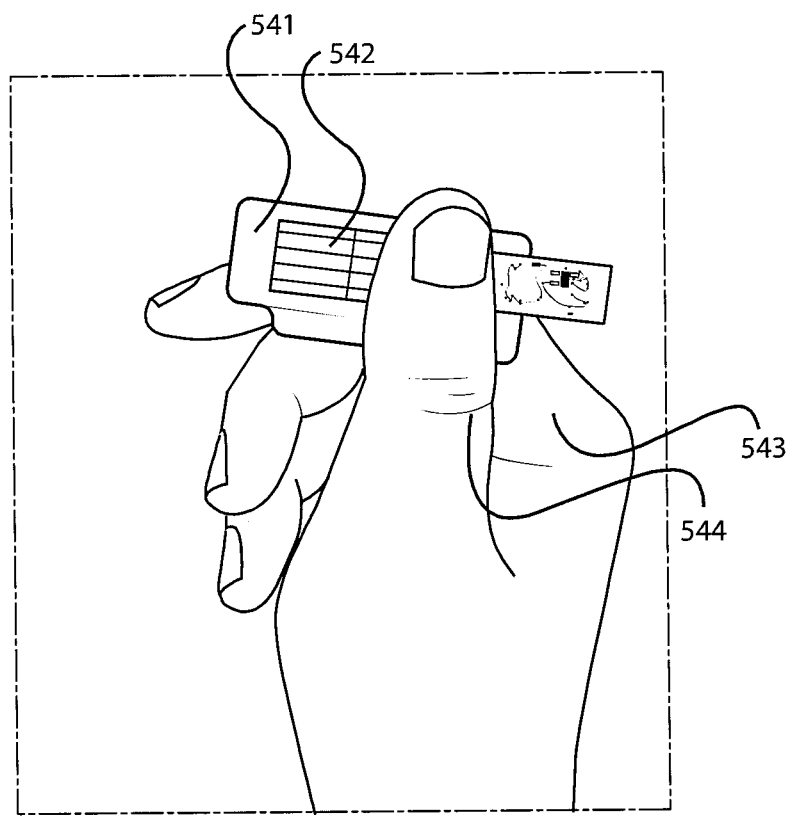

FIGS. 5A-5B are diagrams illustrating variable texture surfaces in relation to sensors according to at least one example embodiment. The examples of FIGS. 5A-5B are merely examples of variable texture surfaces in relation to sensors, and do not limit the scope of the claims. For example, type of one or more sensors may vary, arrangement of one or more sensors may vary, interrelation between one or more sensors may vary, and/or the like.

It may be desirable to provide one or more sensors that correspond with a variable texture surface. For example, it may be desirable to provide a touch sensor, a force sensor, a proximity sensor, and or the like, in relation to a variable texture surface. For example, it may be desirable to provide a variable texture surface that positionally corresponds with a touch sensor. In such an example, a user may provide a touch input, such as any of the touch inputs of FIGS. 4A-4E while perceiving textural representation on the variable texture surface.

FIG. 5A is a diagram illustrating a variable texture surface in relation to sensors according to at least one example embodiment. The example of FIG. 5A illustrates variable texture surface in relation to touch sensor 502 and force sensor 501. In at least one example embodiment, an apparatus may receive input information from touch sensor 502 and/or force sensor 501. The apparatus may cause rendering of one or more textural representations on variable texture surface 503. In this manner, variable texture surface 503 corresponds with touch sensor 502 and force sensor 501. For example, a position on touch sensor 502 may correspond with a complementary position on variable texture surface 503. In at least one example embodiment, a variable texture surface being configured to positionally correspond with a sensor may be referred to as the sensor and the variable texture surface being physically coupled.

In at least one example embodiment, the variable texture surface may be physically coupled with a display. For example, there may a display configured to be between touch sensor 502 and force sensor 501. In this manner, the apparatus may provide visual representations that positionally correspond with visual representation of information on the display.

In some circumstances, it may be desirable for the variable texture surface to be physically decoupled from a display. For example, the display may be a see through display, such as a near eye display. In such an example, it may be undesirable for the user to be feeling a surface that positionally corresponds with the display. For example, a user feeling a textural representation on the surface of a near eye display may occlude objects from view. In some circumstances, it may be unsafe for a user to rely on textural representations on the surface of a near eye display.

In at least one example embodiment, a variable texture surface is physically decoupled from a display. For example, there may be a display and a variable texture surface that are physically separate from each other. For example, the display may be part of a separate apparatus from the apparatus comprising the variable texture surface.

FIG. 5B is a diagram illustrating a variable texture surface in relation to sensors according to at least one example embodiment. In the example of FIG. 5B, pad 542 comprises a touch sensor and a variable texture surface, which is mounted on housing 541. In the example of FIG. 5B, housing 541 is configured to be worn on a hand 544 of a user such thumb 543 of hand 544 may perform touch inputs and receive textural representations from pad 542.

In at least one example embodiment, pad 542 may be used in conjunction with a see through display, such as a near eye display. Without limiting the scope of the claims in any way, at least one technical effect associated with pad 542 being physically decoupled from a display may be to allow utilization of pad 542 without obstructing the display, without obstructing objects viewable through the display, and/or the like.

Even though the example of FIG. 5B illustrates a variable texture surface in relation to sensors on a housing that is configured to be worn on the finger of a user, other configurations may be desirable. For example, the variable texture surface in relation to sensors may be configured to be comprised by a housing of a near eye display. In such an example, the variable texture surface in relation to sensors may be configured to be on the stem of glasses that comprise a near eye display. In another example, the variable texture surface in relation to sensors may be configured to be worn on a wrist of a user, such as on a bracelet housing, a watch housing, and/or the like. The housing to which the variable texture surface in relation to sensors is mounted may relate to any apparatus, such as headphones, a mobile phone, a tablet, a personal digital assistant (PDA), a laptop, a touchpad, a mouse, a ring, and/or the like.

Figure 6:
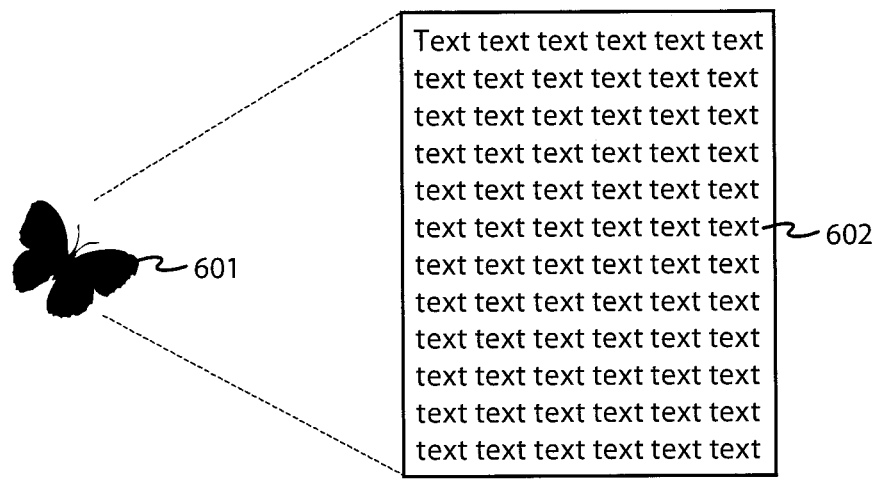
FIG. 6 is a diagram illustrating an information item associated with content according to at least one example embodiment.

FIG. 6 is a diagram illustrating an information item associated with content according to at least one example embodiment. The example of FIG. 6 is merely an example of an information item associated with content, and does not limit the scope of the claims. For example, type of content may vary, type of information item may vary, relationship between the information item and the content may vary, and/or the like.

In at least one example embodiment, an apparatus provides an information item associated with content. The information item may relate to a visual identifier that signifies the associated content. For example the information item may relate to an icon, a word, and/or the like, that identifies the content. The content may be information that may be invoked by way of the information item. For example, the information item may indicate a song, and the content may be information that comprises the song.

In the example of FIG. 6, information item 601 relates to content 602. Even though information item 601 relates to an image of a butterfly, representation of information item 601 may vary. Furthermore, even though content 602 relates to text, content 602 may be any content, such as audio content, video content, image content, and/or the like.

In at least one example embodiment, an apparatus may provide an information item that is a notification. In at least one example embodiment, a notification relates to an information item that signifies an event. For example an event may relate to receiving a message, receiving information, elapse of an amount of time, and/or the like. For example, an event may relate to a time occurring that is associated with a meeting in a calendar. In another example, a notification may relate to the apparatus receiving an email. In at least one example embodiment, a notification provides signal to the user that an action has occurred. In at least one example embodiment, the notification may be associated with content. For example, the event signified by the notification may relate to content. In at least one example embodiment, content associated with a notification is referred to as notification content.

In at least one example embodiment, information item 601 is a notification, and content 602 is notification content. In at least one example embodiment, an apparatus may determine to provide a notification to a user. For example, the apparatus may receive an indication of content, such as a message. In such an example, the apparatus may determine to provide a notification to the user that signifies the received content. In this manner, the received content may become the notification content associated with the message.

In at least one example embodiment, the apparatus may cause display of notification content. For example, the user may perform an invocation input associated with invocation of the notification content, similar as described regarding FIGS. 9A-9B. Upon receiving the invocation input in association with the notification, the apparatus may cause display of the notification content. In at least one example embodiment, the apparatus may cause display of a differing amount of the notification content, similar as described regarding FIGS. 8A-8C.

In at least one example embodiment, the content relates to a content classification. A content classification may relate to a categorization of the type of content of the notification content. For example, a content classification may relate to a content delivery classification, a content perception classification, and/or the like. A content perception classification may relate to the way in which a user perceives the notification content. In at least one example embodiment, a content perception classification relates to text content, audio content, image content, video content, and/or the like. A content delivery classification may relate to a manner in which the content was received. In at least one example embodiment, the content delivery classification relates a message, a phone call, a broadcast, and/or the like. A message may relate to an email, an instant message, a text message, and/or the like. A broadcast may relate to an information feed, a telecast, a radiocast, and/or the like. In some circumstances, received content may be associated with a sender. For example the sender may relate to an entity from which the content was received, such as an email address, a website, a really simple syndication (RSS) feed, and/or the like.

In some circumstances, causing display of notification content may be intrusive to the user. For example, if the display relates to a see through display, causing display of the notification content may obscure a region of the display associated with the display of the notification content. In circumstances where the see through display is a near eye display, such obscurance may raise safety concerns or may be otherwise desirable for the user to limit. In some circumstances, such as the display being a near eye display, it may be desirable to tailor the amount of display area associated with displayed notification content to limit obscurance caused by the displayed notification content.

In some circumstances, the user may be too inattentive to adequately understand the notification content. For example, the user may be walking, driving, and/or the like. In such circumstances, it may be desirable to tailor the notification content displayed to the user to be appropriate to the attentiveness of the user. There are many aspects of the notification content that may affect the user's ability to perceive the notification content. In at least one example embodiment, the attentiveness of a user that allows the user to adequately perceive notification content is referred to as a cognitive load associated with the notification content. In at least one example embodiment, the cognitive load is a value that reflects an amount of cognitive work associated with the user understanding the notification content. In at least one example embodiment, a low cognitive load is indicative of notification content that is easier for the user to understand than notification content indicated by a high cognitive load. For example, a user may be able to adequately perceive notification content associated with a low cognitive load when the user has a low attentiveness level. In another example, a user may be unable to adequately perceive notification content associated with a high cognitive load when the user has a low attentiveness level. In at least one example embodiment, the cognitive load is indicative of visual distraction associated with visual representation of the notification content. For example, a low cognitive load may be indicative of notification content that is less visually distracting than notification content indicated by a high cognitive load. For example, a video may be more distracting than an image, text may be more distracting than a video, and/or the like.

In at least one example embodiment, the cognitive load is based, at least in part, on amount of notification content. For example, a large amount of notification content may involve more attention from the user to adequately perceive than a small amount of notification content. In at least one example embodiment, the cognitive load is based, at least in part, on a content classification associated with the notification content. For example, cognitive load may vary by way of content perception classification, content delivery classification, and/or the like. For example, image notification content may be associated with a different cognitive load than textual notification content.

In at least one example embodiment, the cognitive load is based, at least in part on a sender of the notification content. The cognitive load may be based on identity of the sender, a relationship between the user and the sender, and/or the like. For example, the cognitive load associated with notification content received from a close friend may be different from the cognitive load associated with notification content from a stranger. In such an example, the user may be familiar with context between the user and the sender, such that the notification content may be easier for the user to understand based on the context. For example, a message from an unknown business may involve more attention from the user to understand than a message from the user's spouse. In at least one example embodiment, the relationship upon which the cognitive load is based may be indicative of a social distance between the user and the sender. In at least one example embodiment, a social distance relates to a level of familiarity between the user and the sender. For example, a user's spouse may be associated with a lesser social distance than a stranger to the user. In this manner, the cognitive load may be based, at least in part on the social distance between the user and the sender. In at least one example embodiment, an apparatus evaluates any or all of these aspects, as well as other aspects, of notification content to determine the cognitive load of the notification content.

In at least one example embodiment, an apparatus determines a cognitive load based, at least in part, on the following formula, where C relates to cognitive load, $S_{ft}$ relates to a scaling factor associated with textual content, $A_t$ relates to amount of textual content, $S_{fv}$ relates to a scaling factor associated with video content, $A_v$ relates to amount of video content, $S_{fa}$ relates to a scaling factor associated with audio content, $A_a$ relates to amount of audio content, $S_{fi}$ relates to a scaling factor associated with image content, $A_i$ relates to amount of image content, $S_{fsd}$ relates to a scaling factor associated with social distance, and $S_{sd}$ relates to social distance between the user and the sender of the notification content.

$$C = S_{ft}A_t + S_{fv}A_v + S_{fa}A_a + S_{fi}A_i - S_{fsd}S_{sd}$$

In some circumstances, it may be desirable for the cognitive load of notification content displayed to a user to comply with the attentiveness level of the user. In at least one example embodiment, the cognitive load of notification content being compliant with the attentiveness level of the user relates to the user being able to adequately understand the notification content without increasing the user's attentiveness level. Without limiting the scope of the claims in any way, at least one technical effect associated with the cognitive load of the notification content being compliant with the user's attentiveness level may be to allow the user to perceive the notification content without diverting additional attention to the notification content. In this manner, the apparatus may take measures to align the attentiveness level of the user with the cognitive load of the notification content.

FIGS. 7A-7E are diagrams illustrating notifications indicative of cognitive load of notification content according to at least one example embodiment. The examples of FIGS. 7A-7E are merely examples of notifications indicative of cognitive load of notification content, and do not limit the scope of the claims. For example, representation of the notifications may vary, indication of the notification content may vary, and/or the like.

In some circumstances, it may be desirable for the user to be able to identify a cognitive load associated with notification content prior to the user invoking the notification content. For example, a user performing an activity may desire to invoke notification content associated with a low cognitive load, but may desire to defer invocation of notification content associated with a high cognitive threshold until the user has completed the activity.

In at least one example embodiment, the apparatus provides a notification representation to the user that is indicative of the cognitive load of the notification content associated with the represented notification. In at least one example embodiment, the notification representation is absent any part of the notification content. For example, the notification representation may be indicative of the cognitive load without divulging notification content.

In at least one example embodiment, the apparatus determines a cognitive load associated with notification content and determines a notification representation associated with the notification such that the notification representation is indicative of the cognitive load.

It should be understood that a paradigm upon which notification representation indicates the notification content to the user may vary. Even though the examples of FIGS. 7A-7E may describe an inverse proportionality or a direct proportionality, in some circumstances, it may be desirable to provide for a paradigm that utilizes an inverse relationship as described. For example, some users may associate a brighter notification representation with a greater cognitive load, and other users may associate a brighter notification representation with a lesser cognitive load.

Figure 7A:
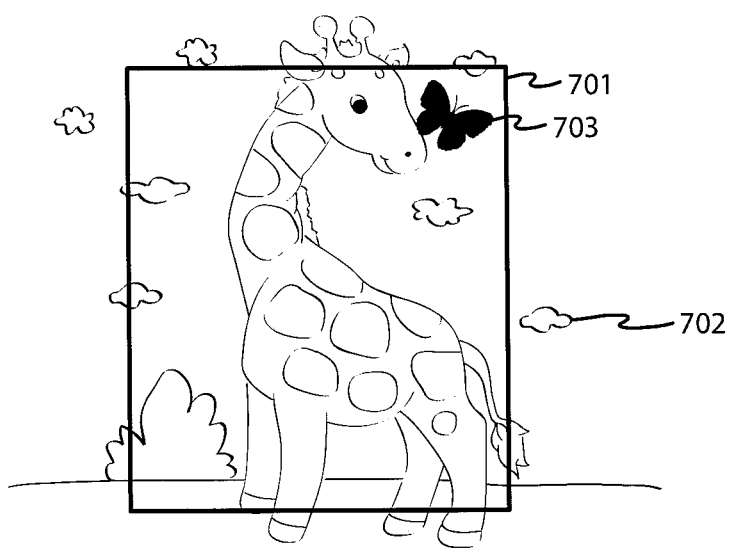
FIGS. 7A-7E are diagrams illustrating notifications indicative of cognitive load of notification content according to at least one example embodiment.

FIG. 7A is a diagram illustrating a notification indicative of cognitive load of notification content according to at least one example embodiment. FIG. 7A illustrates notification representation 703 displayed on see through display 701 in relation to objects 702 which may be seen through see through display 701. In at least one example embodiment, the appearance of the notification representation may be indicative of the cognitive load of the notification content. For example, the appearance of the notification representation may relate to a shape associated with something small, simple, or light, to represent a low cognitive load, and/or may relate to a shape associated with something large, complex, or heavy to represent a high cognitive load. For example, the butterfly of notification representation 703 may be indicative of a low cognitive load. Alternatively, a notification representation along a similar metaphor may indicate a high cognitive load by way of an elephant, a whale, and/or the like. In this manner, the shape of the notification representation may be indicative of a size, even though the size between such different representations may be similar. Consequently, the notification representation may indicate a size difference between different notification representations without differing the size of the representation. In this manner, the shape of a notification representation may be indicative of the cognitive load of the associated notification content.

Figure 7B:
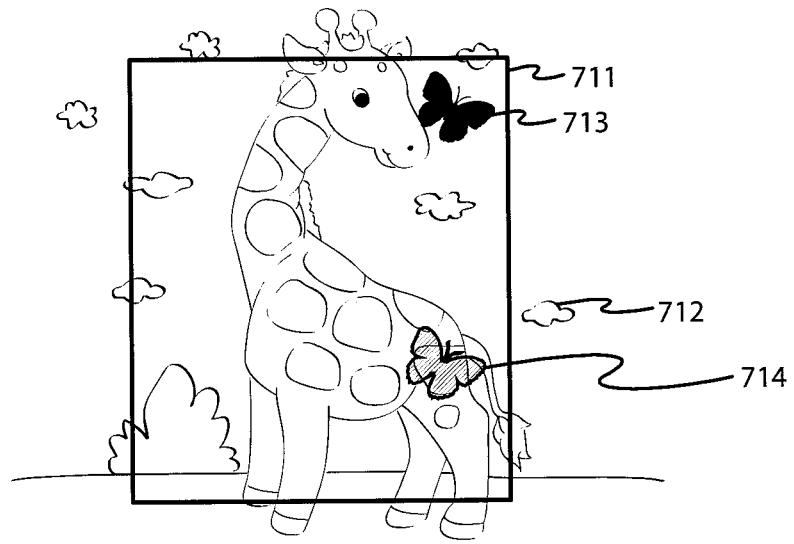

FIG. 7B is a diagram illustrating notifications indicative of cognitive load of notification content according to at least one example embodiment. In at least one example embodiment, an opacity of a notification representation is indicative of a cognitive load of the associated notification content. For example, opacity of the notification representation may be inversely proportional to the cognitive load. In such an example, the opacity of a notification representation may be governed by the equation below, where O represents opacity of the notification representation, $O_{max}$ represents the maximum opacity of the notification representation, C represents the cognitive load, and $S_{fo}$ represents a scaling factor associated with opacity.

$$O = O_{max} - S_{fo}C$$

In such an example, a larger cognitive load may be indicated by a notification representation that is less opaque than a notification representation indicative of a lesser cognitive load. In such an example, the user may easily and intuitively distinguish the notification associated with the lower cognitive load from the notification associated with the higher cognitive load. Therefore, the user can predict the amount of attention that the notification content may involve when the user invokes the notification.

In at least one example embodiment, opacity of the notification representation is controllable by way of controlling brightness of the notification representation. For example, in a see through display, a brighter notification representation may be less opaque than a less bright notification representation. For example, a brighter notification representation may obscure objects viewed through the see through display more than a less bright notification representation. In at least one example embodiment, opacity and brightness are controlled independently of each other.

In at least one example embodiment, a brightness of a notification representation is indicative of a cognitive load of the associated notification content. For example, brightness of the notification representation may be directly proportional to the cognitive load. In such an example, the brightness of a notification representation may be governed by the equation below, where B represents brightness of the notification representation, $B_{min}$ represents the minimum brightness of the notification representation, C represents the cognitive load, and $S_{fb}$ represents a scaling factor associated with brightness.

$$B = B_{min} + S_{fb}C$$

In such an example, a larger cognitive load may be indicated by a notification representation that is brighter than a notification representation indicative of a lesser cognitive load. In such an example, the user may easily and intuitively distinguish the notification associated with the lower cognitive load from the notification associated with the higher cognitive load. Therefore, the user can predict the amount of attention that the notification content may involve when the user invokes the notification.

The example of FIG. 7B illustrates notification representations 713 and 714 displayed on see through display 711 in relation to objects 712 which may be seen through see through display 711. It can be seen that notification representation 714 is more opaque than notification representation 713. In at least one example embodiment, notification representation 714 is indicative of notification content that has a lower cognitive load than the notification content indicated by notification representation 713.

Figure 7C:
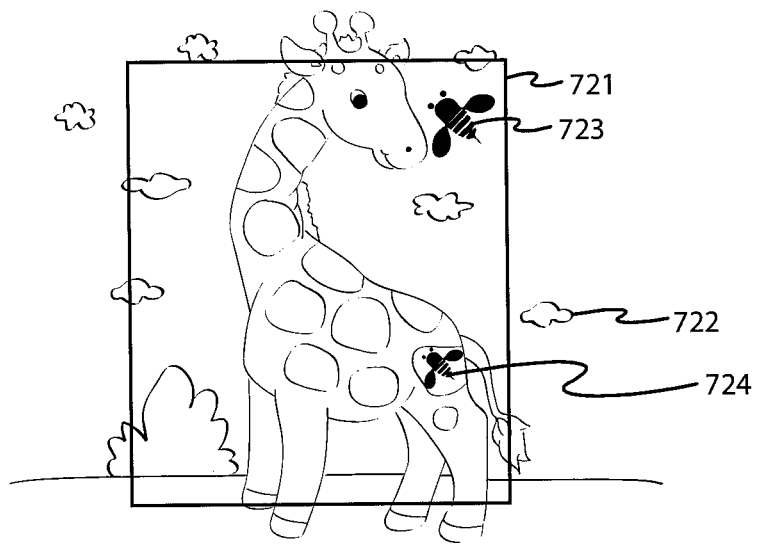

FIG. 7C is a diagram illustrating notifications indicative of cognitive load of notification content according to at least one example embodiment. In at least one example embodiment, a size of a notification representation is indicative of a cognitive load of the associated notification content. For example, size of the notification representation may be directly proportional to the cognitive load. In such an example, the size of the notification representation may be governed by the equation below, where S represents size of the notification representation, $S_{min}$ represents the minimum size of the notification representation, C represents the cognitive load, and $S_{fs}$ represents a scaling factor associated with size.

$$S=S_{min}+S_{fs}C$$

In such an example, a larger cognitive load may be indicated by a notification representation that is larger than a notification representation indicative of a lesser cognitive load. In such an example, the user may easily and intuitively distinguish the notification associated with the lower cognitive load from the notification associated with the higher cognitive load. Therefore, the user can predict the amount of attention that the notification content may involve when the user invokes the notification.

The example of FIG. 7C illustrates notification representations 723 and 724 displayed on see through display 721 in relation to objects 722 which may be seen through see through display 721. It can be seen that notification representation 724 is smaller than notification representation 723. In at least one example embodiment, notification representation 724 is indicative of notification content that has a lower cognitive load than the notification content indicated by notification representation 723.

Figure 7D:
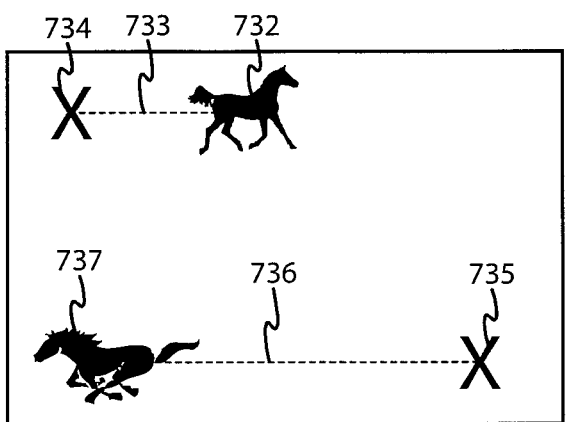

FIG. 7D is a diagram illustrating notifications indicative of cognitive load of notification content according to at least one example embodiment. In at least one example embodiment, movement of a notification representation is indicative of a cognitive load of the associated notification content. In at least one example embodiment, a movement speed of a notification representation is indicative of a cognitive load of the associated notification content. For example, the notification representation may be caused to move along a path on the display. In such an example, the speed at which the notification representation moves along the path may be indicative of the cognitive load. In another example, there may be an animation associated with the notification representation. For example, the notification representation may have an animation indicative of movement. In such an example, speed of the animation may be indicative of the cognitive load. In at least one example embodiment, a speed associated with the notification representation may be inversely proportional to the cognitive load. In such an example, a speed associated with the notification representation may be governed by the equation below, where V represents speed of the notification representation, $V_{max}$ represents the maximum speed of the notification representation, C represents the cognitive load, and $S_{fv}$ represents a scaling factor associated with size.

$$V=V_{max}-S_{fv}C$$

The speed being inversely proportional to the cognitive load may be intuitive to the user, for, at least, the indication that the movement of the notification representation is more burdened in association with a larger cognitive load than with a lesser cognitive load, such that the movement is slower. In such an example, a larger cognitive load may be indicated by a notification representation that has a slower movement than a notification representation indicative of a lesser cognitive load. In such an example, the user may easily and intuitively distinguish the notification associated with the lower cognitive load from the notification associated with the higher cognitive load. Therefore, the user can predict the amount of attention that the notification content may involve when the user invokes the notification.

In at least one example embodiment, the apparatus may guard against movement path of multiple notification representations overlapping. For example, it may be easier for the user to distinguish between notification representations that have movement paths that do not overlap. Therefore, in at least one example embodiment, a movement path of a notification representation is non-overlapping with a movement path of another notification representation.

The example of FIG. 7D illustrates notification representations 732 and 737 displayed on display 731. The example of FIG. 7D illustrates movement of notification representations 732 and 737 during a time interval. During the time interval of FIG. 7D, notification representation 732 moved from position 734 along movement path 733. During the time interval of FIG. 7D, notification representation 737 moved from position 735 along movement path 736. It can be seen that movement speed of notification representation 737 is faster than the movement speed of notification representation 732. In at least one example embodiment, this difference in movement speed is indicative of notification representation 737 being associated with a lower cognitive load than that of notification representation 732.

Figure 7E:
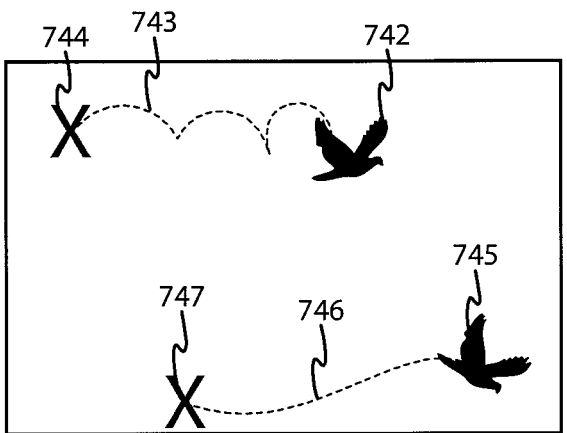

FIG. 7E is a diagram illustrating notifications indicative of cognitive load of notification content according to at least one example embodiment. In at least one example embodiment, movement of a notification representation is indicative of a cognitive load of the associated notification content. In at least one example embodiment, a movement pattern of a notification representation is indicative of a cognitive load of the associated notification content.

In at least one example embodiment, a movement pattern relates to a characteristic of the movement path of a notification representation. For example, a movement path may comprise a repeating movement pattern that characterizes the movement path. For example, the movement pattern may be smooth in that the movement path progresses with slight deviation from a common direction along the path. In another example, the movement pattern may be obtrusive in that the movement path progresses with persistent deviation from a common direction along the movement path. In at least one example embodiment, amount of deviation from a common direction associated with a movement pattern is indicative of a cognitive load. For example, an amount of deviation from a common movement direction may be directly proportional to the cognitive load. In at least one example embodiment, a common movement direction associated with movement of a notification representation relates to a mean direction towards which the notification representation moves over a period of time.

In at least one example embodiment, the movement pattern is indicative of a weight being carried. For example, a movement pattern may indicate a heavy weight by way of a larger amount of deviation from a common direction than that of a light weight. For example, the deviation may be indicative of staggering, struggling, and/or the like. In at least one example embodiment, the weight is directly proportional to the cognitive load.

For example, the notification representation may be caused to move along a path on the display. In such an example, the speed at which the notification representation moves along the path may be indicative of the cognitive load. In another example, there may be an animation associated with the notification representation. For example, the notification representation may have an animation indicative of movement. In such an example, speed of the animation may be indicative of the cognitive load. In at least one example embodiment, a speed associated with the notification representation may be inversely proportional to the cognitive load.

The example of FIG. 7E illustrates notification representations 742 and 745 displayed on display 741. The example of FIG. 7E illustrates movement of notification representations 742 and 745 during a time interval. During the time interval of FIG. 7E, notification representation 742 moved from position 744 along movement path 743 along a common direction towards the right of display 741. During the time interval of FIG. 7E, notification representation 745 moved from position 747 along movement path 746 along a common direction towards the right of display 741. It can be seen that movement pattern of notification representation 745 is associated with less deviation from a common direction that the movement pattern of notification representation 742. In the example of FIG. 7E, notification representations 742 and 745 are shaped to be indicative of a flying entity, and the movement patterns of, notification representations 742 and 745 are indicative of a weight being carried by the flying entity. In at least one example embodiment, this difference in movement pattern is indicative of notification representation 745 being associated with a lower cognitive load than that of notification representation 742.

Figure 8A:
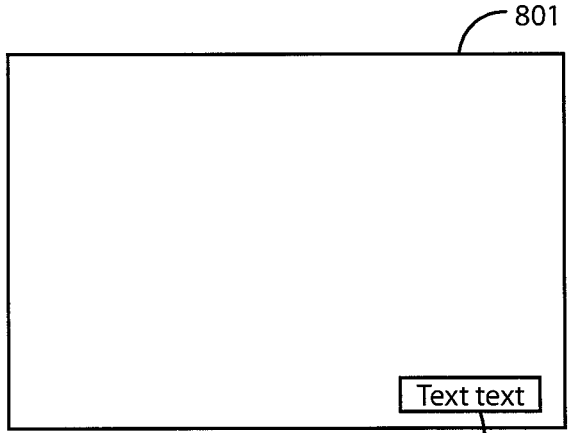
FIGS. 8A-8C are diagrams illustrating display of notification content according to at least one example embodiment.
Figure 8B:
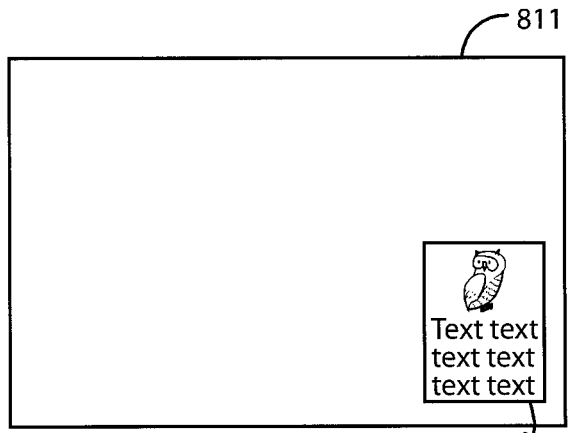
Figure 8C:
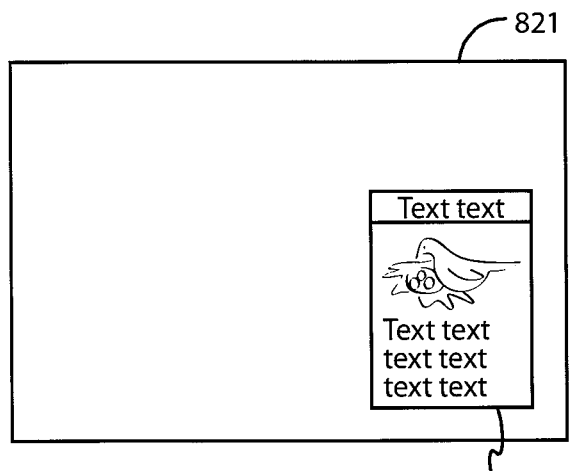

FIGS. 8A-8C are diagrams illustrating display of notification content according to at least one example embodiment. The examples of FIGS. 8A-8C are merely examples of display of notification content, and do not limit the scope of the claims. For example, amount of notification content may vary, format of notification content may vary, position of notification content may vary, and/or the like.

In at least one example embodiment, an apparatus causes display of notification content. In at least one example embodiment, causing display of notification content comprises introduction of the notification content, retention of the notification content, removal of the notification content. In at least one example embodiment, introduction of the notification content relates to a representation of the notification content that is displayed as a prelude to the notification content presented for user understanding of the notification content. For example, introduction of the notification content may relate to an animation that visually transitions the viewing environment from the notification content being absent to the notification content being present. For example, the animation may relate to the notification content expanding from the notification representation, sliding into position from a side of the display, materializing onto the display, and/or the like. In at least one example embodiment, the introduction of the notification content is associated with a duration. The duration may relate to the amount of time that the introduction is present.

In at least one example embodiment, retention of the notification content relates to a representation of the notification content that is displayed for user understanding of the notification content. For example, retention of the notification content may relate to display of a representation of the notification content that is configured for user assimilation of the notification content. For example, retention of the notification content may relate to the notification content shown in the examples of FIGS. 8A-8C. In at least one example embodiment, the retention of the notification content is associated with a duration. The duration may relate to the amount of time that the retention is present. For example, the duration of the retention may relate to the amount of time between the end of the introduction of the notification content and the beginning of the removal of the notification content.

In at least one example embodiment, removal of the notification content relates to a representation of the notification content that is displayed as an epilogue to the notification content presented for user understanding of the notification content. For example, removal of the notification content may relate to an animation that visually transitions the viewing environment from the notification content being present to the notification content being absent. For example, the animation may relate to the notification content compressing to the notification representation, sliding out of view to a side of the display, dematerializing from the display, and/or the like. In at least one example embodiment, the removal of the notification content is associated with a duration. The duration may relate to the amount of time that the removal is present.

As previously discussed, the user adequately understanding the content may involve the user directing attention and concentration towards the content being displayed. In some circumstances, it may be desirable to tailor the content displayed to the attention level that the user desires to allocate to understanding the content. In at least one example embodiment, the apparatus causes display of notification content in compliance with an interaction preference. In at least one example embodiment, the apparatus may cause display of, at least part of, the notification content in compliance with an interaction preference. For example, the apparatus may determine a representation of the notification content that complies with the interaction preference. In such an example, causing display of, at least part of, the notification content in compliance with an interaction preference may comprise causing display of the determined representation of the notification content. In at least one example embodiment, causing display of the notification content in compliance with the interaction preference relates to causing introduction of the notification content in compliance with the interaction preference. In at least one example embodiment, causing display of the notification content in compliance with the interaction preference relates to causing retention of the notification content in compliance with the interaction preference. In at least one example embodiment, causing display of the notification content in compliance with the interaction preference relates to causing removal of the notification content in compliance with the interaction preference. In at least one example embodiment, an interaction preference aspect relates to a part of the interaction preference that governs any one of introduction of the notification content, retention of the notification content, removal of the notification content, and/or the like. In at least one example embodiment, causing display of the notification content in compliance with the interaction preference comprises causing display of the notification content in compliance with the interaction preference aspect.

In at least one example embodiment, an interaction preference relates to a directive governing at least one characteristic of the manner in which information is displayed. The interaction preference may relate to a duration associated with display of notification content, a speed associated with display of content, amount of notification content to be displayed, or an animation associated with display of content.

In at least one example embodiment the duration associated with display of notification content relates to a duration associated with retention of the notification content, a duration associated with introduction of the notification content, a duration associated with removal of the notification content, and/or the like. For example, an interaction preference may indicate a preference for a brief glance of the notification content. In such an example, the duration of the retention of the notification content may be smaller than that of a retention of notification content associated with an interaction preference indicative of a longer viewing.

In at least one example embodiment, the speed associated with display of notification content relates to a speed associated with introduction of the notification content, a speed associated with removal of the notification content, and/or the like. For example, the interaction preference may indicate that the user has little attention to dedicate to the notification content. In such an example, the introduction of the notification content may be quick or instantaneous compared to an introduction of the notification content associated with an interaction preference indicative of a higher user attentiveness level.

In at least one example embodiment, the animation associated with display of notification content relates to an animation associated with introduction of the notification content, an animation associated with removal of the notification content, and/or the like. For example, when the user has an abundance of attention to dedicate to understanding the notification content, the user may appreciate an elaborate and aesthetically pleasing animation. However, when the same user has scarce attention to dedicate to understanding the notification content, the user may become annoyed by having his attention consumed by an elaborate or aesthetically pleasing animation.

Without limiting the claims in any way, at least one technical effect associated with causing display of, at least part of, the notification content in compliance with an interaction preference may be to allow the user to tailor notification content and/or the manner in which notification content is presented, to suit the attention that the user dedicates to understanding the notification content. In addition, in circumstances where the display relates to a see through display, at least one technical effect associated with causing display of, at least part of, the notification content in compliance with an interaction preference may be to allow a user to tailor obscurance of display area associated with display of the notification content on the see through display. In circumstances where the see through display is a near eye display, at least one technical effect associated with causing display of, at least part of, the notification content in compliance with an interaction preference may be to allow a user to avoid potentially dangerous distraction associated with display of the notification content in a manner that interferes with perception of object around the user, or interferes with an activity of the user.

In at least one example embodiment, the interaction preference relates to a predetermined value. For example, there may be a setting associated with the interaction preference that may be configured by the user, by the apparatus manufacturer, by an account manager, by environmental conditions, and/or the like. In at least one example embodiment, the user may vary the interaction preference associated with display of notification content by varying the invocation input associated with invocation of the notification content. In at least one example embodiment, an apparatus may cause display of notification content based, at least in part, on an invocation input. An invocation input may be similar as described regarding FIGS. 9A-9B.

In at least one example embodiment, causation of display of the notification content in compliance with the interaction preference is performed after the termination part of the invocation input. For example, causation of display of the notification content in compliance with the interaction preference may be performed after the user terminates the input. Without limiting the scope of the claims in any way, at least one technical effect associated with causation of display of the notification content in compliance with the interaction preference is performed after the termination part of the invocation input may be to avoid having the user dedicate attention to monitor the display of the notification content and tailor the input in relation to the displayed notification content. For example, the user may desire to perform an input without adjusting the input in relation to the displayed notification content.

In at least one example embodiment, an invocation input is indicative of an attention level. In at least one example embodiment, an attentiveness level relates to a threshold value indicative of a user's cognitive ability to perceive notification content. For example, an input relating to a quick swipe may indicate a lesser attention level than an input relating to a slow drag. In at least one example embodiment, the apparatus determines an attentiveness level based, at least in part, on the invocation input. In such an example, the apparatus may determine the interaction preference based, at least in part, on the attentiveness level. For example, the apparatus may determine the interaction preference to be directly proportional to the attentiveness level. In this manner, the apparatus may tailor the interaction preference to align with the attentiveness level of the user as indicated by the invocation input.

In at least one example embodiment, the amount of notification content to be displayed is based, at least in part on the attentiveness level. For example, the apparatus may cause display of less notification content in relation to a low attentiveness level than in relation to a high attentiveness level. In at least one example embodiment, the amount of notification content to be displayed is based, at least in part on the interaction preference. For example, the apparatus may cause display of less notification content in relation to an interaction preference that is indicative of less dedicated user attention than in relation to an interaction preference that is indicative of less dedicated user attention.

In at least one example embodiment, the apparatus determines an interaction preference based, at least in part, on an input aspect of the invocation input. The input aspect may be similar as described regarding FIGS. 9A-9B.

In at least one example embodiment, determination of the interaction preference comprises determining at least one interaction preference aspect. For example, the apparatus may determine at least one interaction aspect based, at least in part, on an input aspect. In at least one example embodiment, the interaction preference aspect corresponds with the input aspect. In at least one example embodiment, the apparatus determines the interaction preference aspect to be directly proportional to the input aspect. For example, in circumstance where the input aspect relates to a duration of a movement input comprised by the invocation input, the interaction preference aspect may relate to an introduction of the notification content having a duration directly proportional to the duration of the movement input, retention of the notification content having a duration directly proportional to the duration of the movement input, removal of the notification content having a duration directly proportional to the duration of the movement input, and/or the like. In another example, in circumstances where the input aspect relates to a distance of a movement input comprised by the invocation input, the interaction preference aspect may relate to an introduction of the notification content having a duration directly proportional to the distance of the movement input, retention of the notification content having a duration directly proportional to the distance of the movement input, removal of the notification content having a duration directly proportional to the distance of the movement input, and/or the like.

In at least one example embodiment, the apparatus determines the interaction preference aspect to be inversely proportional to the input aspect. For example, in circumstance where the input aspect relates to a speed of a movement input comprised by the invocation input, the interaction preference aspect may relate to an introduction of the notification content having a duration inversely proportional to the speed of the movement input, retention of the notification content having a duration inversely proportional to the speed of the movement input, removal of the notification content having a duration inversely proportional to the speed of the movement input, and/or the like.

In at least one example embodiment, the interaction preference comprises an expressiveness preference. In at least one example embodiment, an expressiveness preference relates to a desired level of expressiveness in the display of the notification content. For example, a high expressiveness preference may be indicative of a higher level of elaborate and aesthetically pleasing animation than that of a low expressiveness preference. In at least one example embodiment, the apparatus determines an expressiveness preference based, at least in part, on an input aspect. In at least one example embodiment, the interaction preference relates to an animation associated with display of content. For example, the interaction preference may comprise an expressiveness preference, and the animation may be based, at least in part, on the expressiveness preference.

As previously described, an amount of notification content to be displayed may be based, at least in part on the attentiveness level. In at least one example embodiment, the apparatus determines an attentiveness level based, at least in part, on the invocation input. In at least one example embodiment, the apparatus determines the attentiveness level to be directly proportional to an input aspect. For example, in circumstance where the input aspect relates to a duration of a movement input comprised by the invocation input, the attentiveness level may be directly proportional to the duration. In another example, in circumstances where the input aspect relates to a distance of a movement input comprised by the invocation input, the attentiveness level may be directly proportional to the distance. In at least one example embodiment, the apparatus determines the attentiveness level to be inversely proportional to the input aspect. For example, in circumstance where the input aspect relates to a speed of a movement input comprised by the invocation input, the attentiveness level may be inversely proportional to the speed.

In at least one example embodiment, the interaction preference may be based, at least in part, on cognitive load associated with the notification content. For example, if the cognitive load of notification content is high, the interaction preference may be indicative of display of a subset of the notification content. In another example, if the cognitive load of the notification content is high, the interaction preference may be indicative of display of the entirety of the notification content.

In the examples of FIGS. 8A-8B, the notification content displayed is described in terms of small, moderate, and large. These terms are used only for comparison between each other, and are not intended to specifically quantify any amount of content or size of the displayed content on a display.

FIG. 8A is a diagram illustrating display of notification content according to at least one example embodiment. In the example of FIG. 8A, the apparatus causes display of a part of notification content 802 on display 801. In the example of FIG. 8A, the part of the notification content may relate to a small amount of the notification content. For example, the interaction preference may be indicative of a low level of user attention. In such an example, the apparatus may determine to display a small amount of the notification content in response to an invocation input. In at least one example embodiment, the apparatus determines the small amount of the notification content to be a title associated with the notification content, such as an email subject, a filename, a song name, and/or the like. In at least one example embodiment, the apparatus determines the small amount of the notification content to be a small subset of the notification content, such as an excerpt from the notification content, an image form the notification content, and/or the like. In at least one example embodiment, the amount of notification content may be based on the amount of display space associated with the notification content. For example, the apparatus may determine an allowable notification content representation size based, at least in part, on the interaction preference, and based the amount of notification content, at least in part, on the amount of the notification content that will fit within the notification content representation size. In the example of FIG. 8A, the part of notification content 802 may be based, at least in part, on a small notification content representation size.

FIG. 8B is a diagram illustrating display of notification content according to at least one example embodiment. In the example of FIG. 8B, the apparatus causes display of a part of notification content 812 on display 811. In the example of FIG. 8B, the part of the notification content may relate to a moderate amount of the notification content. For example, the interaction preference may be indicative of a moderate level of user attention. In such an example, the apparatus may determine to display a moderate amount of the notification content in response to an invocation input. In at least one example embodiment, the apparatus determines the moderate amount of the notification content to be an image associated with the notification content, a subset of a body of the notification content, a title associated with the notification content, and/or the like. In at least one example embodiment, the amount of notification content may be based on the amount of display space associated with the notification content. For example, the apparatus may determine an allowable notification content representation size based, at least in part, on the interaction preference, and based the amount of notification content, at least in part, on the amount of the notification content that will fit within the notification content representation size. In the example of FIG. 8B, the part of notification content 812 may be based, at least in part, on a moderate notification content representation size.

FIG. 8C is a diagram illustrating display of notification content according to at least one example embodiment. In the example of FIG. 8C, the apparatus causes display of a part of notification content 822 on display 821. In the example of FIG. 8C, the part of the notification content may relate to a large amount of the notification content. For example, the interaction preference may be indicative of a large level of user attention. In such an example, the apparatus may determine to display a large amount of the notification content in response to an invocation input. In at least one example embodiment, the apparatus determines the large amount of the notification content to be an image associated with the notification content, a subset of a body of the notification content, a title associated with the notification content, and/or the like. In at least one example embodiment, the amount of notification content may be based on the amount of display space associated with the notification content. For example, the apparatus may determine an allowable notification content representation size based, at least in part, on the interaction preference, and based the amount of notification content, at least in part, on the amount of the notification content that will fit within the notification content representation size. In the example of FIG. 8C, the part of notification content 822 may be based, at least in part, on a large notification content representation size.

FIGS. 9A-9B are diagrams illustrating invocation inputs according to at least one example embodiment. The examples of FIGS. 9A-9B are merely examples of invocation inputs, and do not limit the scope of the claims. For example, number of parts of the input may vary, types of inputs may vary, aspects of the inputs may vary, and/or the like.

In at least one example embodiment, an apparatus causes display of, at least part of, notification content in response to receiving an invocation input in relation to a notification representation associated with the notification content. In invocation input may be an input indicative of selecting the notification representation in a manner that invokes display of the notification content. For example, a position of the invocation input may correspond with a position of, at least part of, the notification representation.

In at least one example embodiment, an invocation input relates to a touch input, such as the touch inputs of FIGS. 4A-4E. The invocation input may comprise an initiation part and a termination part. An initiation part of the invocation input may relate to a contact input, similar as described regarding FIGS. 4A-4E. A termination part of the invocation input may relate to a release input, similar as described regarding FIGS. 4A-4E. In at least one example embodiment, such a touch input may be received by way of a touch sensor that relates to a variable texture surface, similar as described regarding FIGS. 5A-5B. In at least one example embodiment, an invocation input relates to a gesture input, such as a motion of the apparatus, a motion of the hand of the user, and/or the like. In at least one example embodiment, the apparatus predicates display of notification content upon determination that a received input is an invocation input. As previously described, an invocation input may comprise one or more input aspects. In at least one example embodiment, an input aspect relates to a movement speed, a force, a direction, a number of contact inputs, and/or the like.

FIG. 9A is a diagram illustrating an invocation input according to at least one example embodiment. In at least one example embodiment, the invocation input comprises at least one part in addition to the initiation part and the termination part. For example, the invocation input may comprise at least one movement part. FIG. 9A illustrates an invocation input comprising initiation part 901, movement part 902, and termination part 903. The movement part may be similar to a touch movement input, such as movement input 444 of FIG. 4C, an apparatus gesture movement, a user gesture movement, and/or the like.

In at least one example embodiment, the movement part corresponds with movement of the notification representation. For example, the movement part may correspond with movement 743 of FIG. 7E, movement 736 of FIG. 7D, and/or the like. In at least one example embodiment, the apparatus may determine the movement part to be a movement part that corresponds with the movement of the notification representation.

FIG. 9B is a diagram illustrating an invocation input according to at least one example embodiment. In at least one example embodiment, the invocation input comprises multiple parts in addition to the initiation part and the termination part. For example, the invocation input may comprise a plurality of movement parts. FIG. 9B illustrates an invocation input comprising initiation part 911, movement part 912, movement part 913, movement part 914, and termination part 915. The movement part may be similar to a touch movement input, such as movement input 444 of FIG. 4C, an apparatus gesture movement, a user gesture movement, and/or the like. In this manner, a movement part may comprise a plurality of movement parts to be performed in a designated sequence.

It can be seen that the invocation input of FIG. 9B is more complex than the invocation input of FIG. 9A. In some circumstances, it may be desirable for the invocation input to be complex. For example, it may be desirable for the complexity of the invocation input to be directly proportional to the cognitive load of the notification content. For example, performing a complex input may involve a greater amount of attention from the user than performing a less complex input. By performing a complex input, the user is providing verification of the user's attentiveness to the apparatus. Therefore, by having more complex invocation inputs being associated with higher cognitive loads and less complex invocation inputs being associated with lower cognitive loads, the apparatus may determine that a user has an appropriate attention directed to the apparatus to be able to understand the notification content based on the user's performance of the invocation input. For at least this reason, it may be desirable for the apparatus to determine the invocation input associated with notification content based, at least in part, on the cognitive load of the notification content. In this manner, the invocation input associated with notification content may be indicative of the cognitive load of the notification content.

As indicated in FIGS. 9A and 9B, complexity of the invocation input may relate to a number of parts comprised by the invocation input. For example, a more complex invocation input may have a greater number of parts than the number of parts associated with a less complex invocation input. For example, a number of movement parts comprised by the invocation input may be directly proportional to the cognitive load. In at least one example embodiment, a movement part comprised by the invocation input is associated with a distance that is directly proportional to the cognitive load. For example, a longer distance may relate to a higher cognitive load and a shorter distance may relate to a lower cognitive load.

Even though the examples of FIGS. 9A and 9B illustrate invocation inputs comprising movement parts, the invocation inputs may comprise other types of parts instead of or in addition to a movement part. For example, the invocation input may comprise a tap input, a proximity input, a speech input, a visual input, and/or the like. In at least one example embodiment, complexity of the invocation input relates to a diversity of parts comprised by the invocation input. Diversity of parts may relate to a number of different input classifications comprised by the invocation input. For example, an invocation input comprising a speech part and a movement part may be more complex than an invocation input comprising two movement parts.

In at least one example embodiment, duration of one or more parts of the invocation input is directly proportional to the cognitive load. For example, a user performing an input having a longer duration may involve more attention from the user than an input having a shorter duration.

In this manner, the invocation input may be associated with a cognitive burden on the user that is proportional to the cognitive load of the notification content. It may be desirable to impose a cognitive burden on the user that is directly proportional to the cognitive load. By predicating the display of the notification content upon performance of such a cognitive burden, the apparatus may allow the user to become acclimatized to the amount of attention associated with the notification content. For example, the user may determine that he is unable to dedicate sufficient attention to satisfy the burden of the invocation input. In such circumstances, the user may have been unable to dedicate sufficient attention to understand notification content associated with a similar cognitive load. In this manner, the cognitive burden relates to an attentiveness level of the user. It may be further desirable to impose such cognitive burden on invocation of notification content associated with a see through display, such as a near eye display, for example, to avoid distraction associated with the user attempting to understand the notification content.

FIG. 10 is a diagram illustrating an invocation input in relation to a cognitive load range according to at least one example embodiment. The example of FIG. 10 is merely an example of an invocation input in relation to a cognitive load range, and does not limit the scope of the claims. For example, number of cognitive load ranges may vary, number of invocation inputs may vary, relationship between cognitive load range and invocation input may vary, and/or the like.

In at least one example embodiment, an apparatus determines an invocation input based, at least in part, on selection of a predetermined invocation input. For example, the apparatus may comprise a set list of invocation inputs associated with varying levels of complexity. In at least one example embodiment, the apparatus selects a predetermined invocation input that has a complexity that corresponds with a cognitive load of the notification content to which the notification content will be associated. The predetermined invocation input may be configured by the user, by the apparatus manufacturer, by an account manager, by environmental conditions, and/or the like. In at least one example embodiment, a predetermined invocation input is associated with a cognitive load range. A cognitive load range may relate to a set of contiguous cognitive load values. In this manner, the apparatus may determine an invocation input based, at least in part, on determination that the cognitive load is within a cognitive load range associated with the invocation input. In at least one example embodiment, the apparatus may utilize a table that indicates association between cognitive load ranges and invocation inputs.

The example of FIG. 10 illustrates a structure for associating cognitive load ranges with invocation inputs. It can be seen that the structure of FIG. 10 comprises an association between cognitive load range 1001 and invocation input 1005, an association between cognitive load range 1002 and invocation input 1006, an association between cognitive load range 1003 and invocation input 1007, and an association between cognitive load range 1004 and invocation input 1008.

Figure 11A:
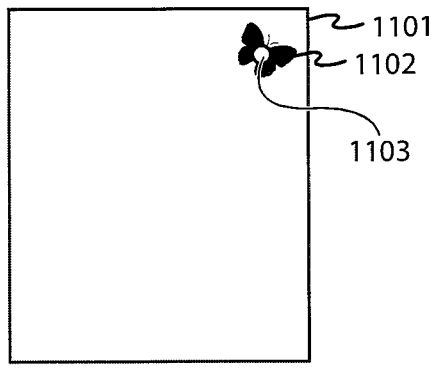
FIGS. 11A-11C are diagrams illustrating selection points according to at least one example embodiment.
Figure 11B:
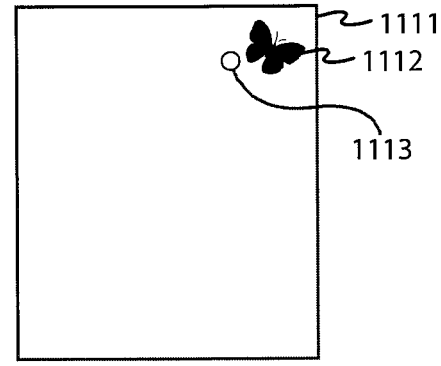
Figure 11C:
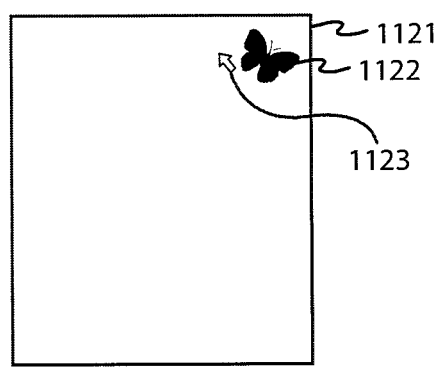

FIGS. 11A-11C are diagrams illustrating selection points according to at least one example embodiment. The examples of FIGS. 11A-11C are merely examples of selection points, and do not limit the scope of the claims. For example, representation of the selection point may vary, position of the selection point may vary, relation between the selection point and the notification may vary, and/or the like.

In at least one example embodiment, a user may interact with a notification representation by way of a selection point. It may be desirable to utilize a selection point in circumstances where an input device, such as a touch sensor, is not physically coupled with the display. In at least one example embodiment, a selection point relates to a position on the display that relates to a position associated with an input device. In at least one example embodiment, the position of the selection point correlates to a fixed position of a touch sensor associated with input. In circumstances where the touch sensor corresponds to the a variable texture surface, the position of the selection point may correlate to a fixed position of the variable texture surface. For example, the fixed position of the variable texture surface may be a geometric center of the variable texture surface, a position associated with a visual indication on the variable texture surface, and/or the like.

In some circumstances, the apparatus may move the position of the selection point. In at least one example embodiment, the position of the selection point is based, at least in part, on touch sensor information received from the touch sensor. For example, in some circumstances, movement input received by the touch sensor corresponds with movement of the selection point. In this manner, the touch sensor information may be indicative of selection point movement. In at least one example embodiment, the position of the selection point is based, at least in part, on gaze tracking information. For example the apparatus may receive gaze tracking information indicative of a position on the display at which the user is gazing. In such circumstances, the selection point may correspond with the position indicated by the gaze tracking information. In this manner, the gaze tracking information may be indicative of the selection point.

In at least one example embodiment, the selection point may be visually unrepresented. In at least one example embodiment, a selection point being visually unrepresented relates to a selection point which is not represented by any visual indication provided on a display. Without limiting the scope of the claims in any way, at least one technical effect associated with a visually unrepresented selection point may be to avoid distraction to the user associated with presence and movement of a visual indication of a selection point. Such effect may be desirable in conjunction with a see through display or a near eye display, where a visual representation of a selection point may obstruct a user's ability to see objects through the display.

FIG. 11A is a diagram illustrating a selection point according to at least one example embodiment. In the example of FIG. 11A, selection point 1103 is at a position that corresponds with notification representation 1102 on display 1101. Even though the position of selection point 1103 is represented as a visible circle, selection point 1103 may be visually unrepresented.

FIG. 11B is a diagram illustrating a selection point according to at least one example embodiment. In the example of FIG. 11B, selection point 1113 is at a position that proximate to notification representation 1112 on display 1111. It can be seen that notification representation 1112 is to the right of selection point 1113. Even though the position of selection point 1113 is represented as a visible circle, selection point 1113 may be visually unrepresented.

FIG. 11C is a diagram illustrating a selection point according to at least one example embodiment. In the example of FIG. 11C, selection point 1123 is at a position that proximate to notification representation 1122 on display 1121. It can be seen that notification representation 1122 is to the right of selection point 1123. It can be seen that selection point 1123 is visually indicated by an arrow.

Figure 12A:
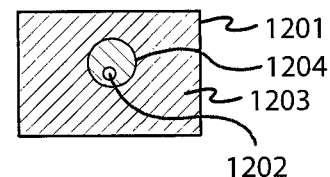
FIGS. 12A-12C are diagrams illustrating textural representations according to at least one example embodiment.
Figure 12B:
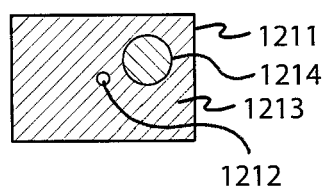
Figure 12C:
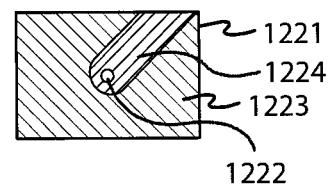

FIGS. 12A-12C are diagrams illustrating textural representations according to at least one example embodiment. The examples of FIGS. 12A-12C are merely examples of textural representations, and do not limit the scope of the claims. For example, size of the textural representation may vary, shape of the textural representation may vary, orientation of the textural representation may vary, and/or the like.

It may be desirable for a user to be able to perceive a textural indication of the notification content associated with a notification. For example, the user may desire to perceive an indication of notification content without diverting visual attention from a task that the user is performing. In at least one example embodiment, the apparatus determines a textural representation of the notification based, at least in part, on notification content associated with the notification. In at least one example embodiment, the apparatus causes rendering of the textural representation of the notification on a variable texture surface. In this manner, the user may be able to perceive the textural representation of the notification by way of the variable texture interface.

In at least one example embodiment, the apparatus may determine the textural representation of the notification based, at least in part, on a content classification associated with the notification content. The content classification may be similar as described regarding FIG. 6. In such an example, the textural representation of the notification may be indicative of the content classification. The apparatus may determine the content classification.

In at least one example embodiment, the apparatus determines the textural representation of the notification based, at least in part, on the cognitive load of the notification content associated with the notification. In this manner, the textural representation of the notification may be indicative of the cognitive load of the notification content associated with the notification. Without limiting the claims in any way, at least one technical advantage associated with the textural representation of the notification may be indicative of the cognitive load of the notification content associated with the notification may be to allow the user to perceive the cognitive load associated with the notification content without allocating visual attention to the notification, to the notification content, and/or the like. In at least one example embodiment, the notification content is absent information that designates a texture. In at least one example embodiment, the apparatus determines the textural representation of the notification independently of any textural information comprised by the notification content. For example, in some circumstances, the apparatus may determine the textural representation of the notification without consideration of any textural information comprised by the notification content.

In at least one example embodiment, the textural representation is directly proportional to the cognitive load. For example, the magnitude of the textural representation of the notification may be directly proportional to a magnitude of the cognitive load. In at least one example embodiment, magnitude of a textural representation relates to the amount of sensory excitation experienced by the user in relation to the textural representation. In another example, a size of the textural representation of the notification may be directly proportional to the cognitive load. In at least one example embodiment, size of a textural representation relates to an amount of surface area associated with the textural representation. In some circumstances, the textural representation may relate to an a surface area larger than the variable texture surface upon which the textural representation is rendered. In such circumstances, a user may perceive the size of the textural representation by way of moving a selection point in relation to the textural representation.

In at least one example embodiment, the apparatus determines a texture type of a textural representation, such as the textural representation of the notification. The texture type may relate to a classification of texture. For example, a texture type may relate to a smooth texture, a rough texture, a hairy texture, a furry texture, a scaly texture, and/or the like. The apparatus may determine the texture type, based, at least in part, on notification content. For example, the texture type may be indicative of cognitive load of the notification content, one or more content classification of the notification content, and/or the like.

In at least one example embodiment, the apparatus determines a position of the textural representation of the notification. The position may relate to position of a selection point. The selection point may be similar as described regarding FIGS. 11A-11C. In at least one example embodiment, the position of the textural representation of the notification relates to a position on the variable texture surface. In at least one example embodiment, the textural representation of the notification comprises texture, similar as described regarding FIGS. 3A-3D, heat, haptic pulses, and/or the like.

In at least one example embodiment, the textural representation of the notification is based, at least in part on a sender of the notification content. The sender may be similar as described regarding FIG. 6. In this manner, the textural representation of the notification may be indicative of the sender. For example, the apparatus may associate a predetermined texture type with a sender. In at least one example embodiment, the textural representation of the notification is based, at least in part on a relationship between the user and the sender. The relationship may be similar as described regarding FIG. 6. In such an example, notification content received from a user's spouse may be associated with a soft texture type. In this manner the textural representation of the notification may be indicative of the relationship.

In some circumstances, it may be desirable for the user to receive guidance regarding an invocation input. For example, as previously described, an invocation input, may be complex. In such circumstances, it may be desirable to provide the guidance without visually distracting the user. In at least one example embodiment, the apparatus determines a textural guidance indicative of, at least part of, an invocation input.

In some circumstances, it may be desirable to limit provision of guidance to circumstances where the apparatus has determined that the user may be performing an invocation input, to circumstances where the apparatus has determined which invocation input that the user may be performing, and/or the like.

In at least one example embodiment, the apparatus determines that a received input corresponds with a first part of an invocation input. In such an example, the apparatus may identify a second part of the invocation input. The second part of the invocation input may be immediately subsequent to the first part of the invocation input. In at least one example embodiment, the apparatus causes rendering of a textural representation of guidance that is indicative of the second part of the invocation input. In at least one example embodiment, the apparatus determines the textural representation of the guidance based, at least in part, on the second part of the invocation input.

In at least one example embodiment, the textural representation of the guidance relates to a texture that is communicative of a preference for a movement input. For example, the user may intuitively perceive how to perform the movement of the second input based, at least in part, on the textural representation of the guidance. In at least one example embodiment, the textural representation of the guidance relates to less textural resistance in a direction that complies with the second part than the textural resistance in a direction that fails to comply with the second part. For example, the textural representation of the guidance being indicative of a direction that complies with the second part may relate to being indicative of animal fur being stroked along the lay of the fur. In another example, the textural representation of the guidance being indicative of a direction that fails to comply with the second part relates to being indicative of animal fur being stroked in opposition to the lay of the fur.

In at least one example embodiment, the textural representation of the guidance relates to a texture that is communicative of a preference for a force input. For example, the user may intuitively perceive how to apply the force of the second input based, at least in part, on the textural representation of the guidance. In at least one example embodiment, the textural representation of the guidance relates to less textural resistance to indicate a lesser force input than the textural resistance of a greater force. In at least one example embodiment, the textural representation of the guidance relates to greater textural resistance to indicate a lesser force input than the textural resistance of a greater force.

In some circumstances, it may be desirable for the textural representation of the guidance to relate to variation of texture based on input that the user is performing. For example, the apparatus may determine the textural representation of guidance based on an indication of input that the user is performing. For example, the textural representation of the guidance may vary at the position where the user is touching the variable texture surface. For example, after receiving the first input as described above, the apparatus may receive an indication of a direction associated with, at least part of, the second input.

The apparatus may determine the textural representation of the guidance based, at least in part, on a difference between a direction of the second input and the direction associated with the second input. For example, upon receiving an indication that the direction of, at least part of, the second input becomes compliant with the second part of the invocation input, the apparatus may reduce textural resistance of the textural representation of the guidance based, at least in part, on the direction. In another example, upon receiving an indication that the direction of, at least part of, the second input becomes non-compliant with the second part of the invocation input, the apparatus may increase textural resistance of the textural representation of the guidance based, at least in part, on the direction.

The apparatus may determine a textural representation that is communicative of a difference between the force of the second part of the invocation input and a force of the second input. For example, upon receiving an indication of force associated with, at least part of, the second input, the apparatus may determine the textural representation of guidance based, at least in part, on a difference between a force of the second input and the force input. In such an example, upon receiving an indication that a force of, at least part of, the second input becomes less than the force input of the second part of the invocation input, the apparatus may reduce textural depth of the textural representation of the guidance based, at least in part, on the force of the second input and the force input of the second part of the invocation input. In another example, upon receiving an indication that a force of, at least part of, the second input becomes greater than the force input of the second part of the invocation input, the apparatus may increase textural depth of the textural representation of the guidance based, at least in part, on the force of the second input and the force input of the second part of the invocation input.

FIG. 12A is a diagram illustrating textural representations according to at least one example embodiment. In the example of FIG. 12A, texture representation 1204 is rendered on variable texture surface 1201 in relation to selection point 1202. The shading of FIG. 12A indicates that the texture of textural representation 1204 differs from the texture of the variable texture surface at positions that do not correspond with visual representation 1204, by having a texture indicated by texture 1203.

In at least one example embodiment, textural representation 1204 relates to a textural representation of a notification. For example, textural representation 1204 may be a textural representation of notification 1102 of FIG. 11A. It should be understood that the shape of textural representation 1204 may vary. In some examples, there may be differences between the shape of the notification representation and the shape of the textural representation of the notification. For example, resolution of the variable texture surface may cause differences between the shape of the notification representation and the shape of the textural representation of the notification. It can be seen that textural representation 1204 is positioned with respect to selection point 1202 similarly as notification representation 1102 is positioned with respect to selection point 1103. In this manner, a user may perceive that touching a position that corresponds with textural representation 1204 relates to an input associated with notification representation 1102, even if selection point 1103 is not visually represented.

In at least one example embodiment, textural representation 1204 relates to a textural representation of a guidance. For example, textural representation of the guidance may relate to a textural representation of guidance for a force input. For example, textural representation may be a texture indicative of a force to be applied as part of an invocation input.

FIG. 12B is a diagram illustrating textural representations according to at least one example embodiment. In the example of FIG. 12B, texture representation 1214 is rendered on variable texture surface 1211 in relation to selection point 1212. The shading of FIG. 12B indicates that the texture of textural representation 1214 differs from the texture of the variable texture surface at positions that do not correspond with visual representation 1214, by having a texture indicated by texture 1213.

In at least one example embodiment, textural representation 1214 relates to a textural representation of a notification. For example, textural representation 1214 may be a textural representation of notification 1112 of FIG. 11B. It should be understood that the shape of textural representation 1214 may vary. In some examples, there may be differences between the shape of the notification representation and the shape of the textural representation of the notification. For example, resolution of the variable texture surface may cause differences between the shape of the notification representation and the shape of the textural representation of the notification. It can be seen that textural representation 1214 is positioned with respect to selection point 1212 similarly as notification representation 1112 is positioned with respect to selection point 1113. In this manner, a user may perceive that touching a position that corresponds with textural representation 1214 relates to an input associated with notification representation 1112, even if selection point 1113 is not visually represented.

In at least one example embodiment, textural representation 1214 relates to a textural representation of a guidance. For example, textural representation of the guidance may relate to a textural representation of guidance for a force input. For example, textural representation may be a texture indicative of a force to be applied as part of an invocation input.

FIG. 12C is a diagram illustrating textural representations according to at least one example embodiment. In the example of FIG. 12C, texture representation 1224 is rendered on variable texture surface 1221 in relation to selection point 1222. The shading of FIG. 12C indicates that the texture of textural representation 1224 differs from the texture of the variable texture surface at positions that do not correspond with visual representation 1224, by having a texture indicated by texture 1223.

In at least one example embodiment, textural representation 1224 relates to a textural representation of a guidance associated with a movement part of an invocation input. It can be seen that textural representation 1221 is elongated in a direction from the selection point. In this manner, textural representation 1224 relates to a direction of the movement input. For example, the direction of the movement part of the invocation input may be similar to the direction in which textural representation 1224 extends from selection point 1223. In at least one example embodiment, a textural representation of guidance associated with a movement part of an invocation input is referred to as a textural path on the variable texture surface. Textural representation 1224 may relate to a textural path on the variable texture surface. For example, textural representation 1224 may correspond to a lesser textural resistance along the textural path than the textural resistance outside of the textural path, as indicated by texture 1223. In another example, textural representation 1224 may correspond to a greater textural resistance along the textural path than the textural resistance outside of the textural path, as indicated by texture 1223.

Figure 13:
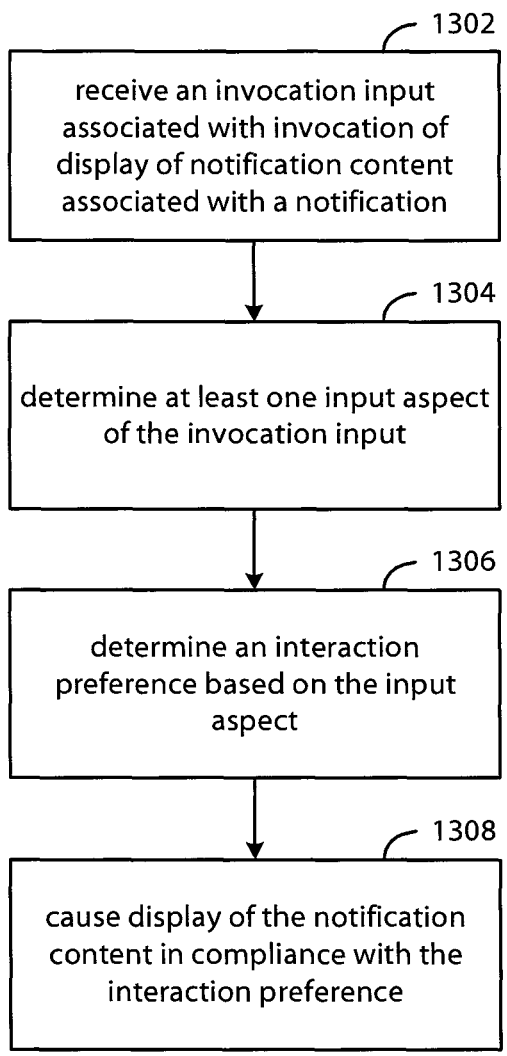
FIG. 13 is a flow diagram illustrating activities associated with causing display of notification content according to at least one example embodiment.

FIG. 13 is a flow diagram illustrating activities associated with causing display of notification content according to at least one example embodiment. In at least one example embodiment, there is a set of operations that corresponds the activities of FIG. 13. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 13.

At block 1302, the apparatus receives an indication of an invocation input associated with invocation of display of, at least part of, a notification content associated with a notification. The receiving, the invocation input, the invocation of display, the notification, and the notification content may be similar as described regarding FIG. 6, FIGS. 8A-8C, and FIGS. 9A-9B.

At block 1304, the apparatus determines at least one input aspect of the invocation input. The determination and the input aspect may be similar as described regarding FIGS. 9A-9B.

At block 1306, the apparatus determines an interaction preference based, at least in part, on the input aspect. The determination and the interaction preference may be similar as described regarding FIGS. 8A-8C.

At block 1308, the apparatus causes display of, at least part of, the notification content in compliance with the interaction preference. The causation of display, display of the notification content, and compliance with the interaction preference may be similar as described regarding FIG. 6 and FIGS. 8A-8C.

Figure 14:
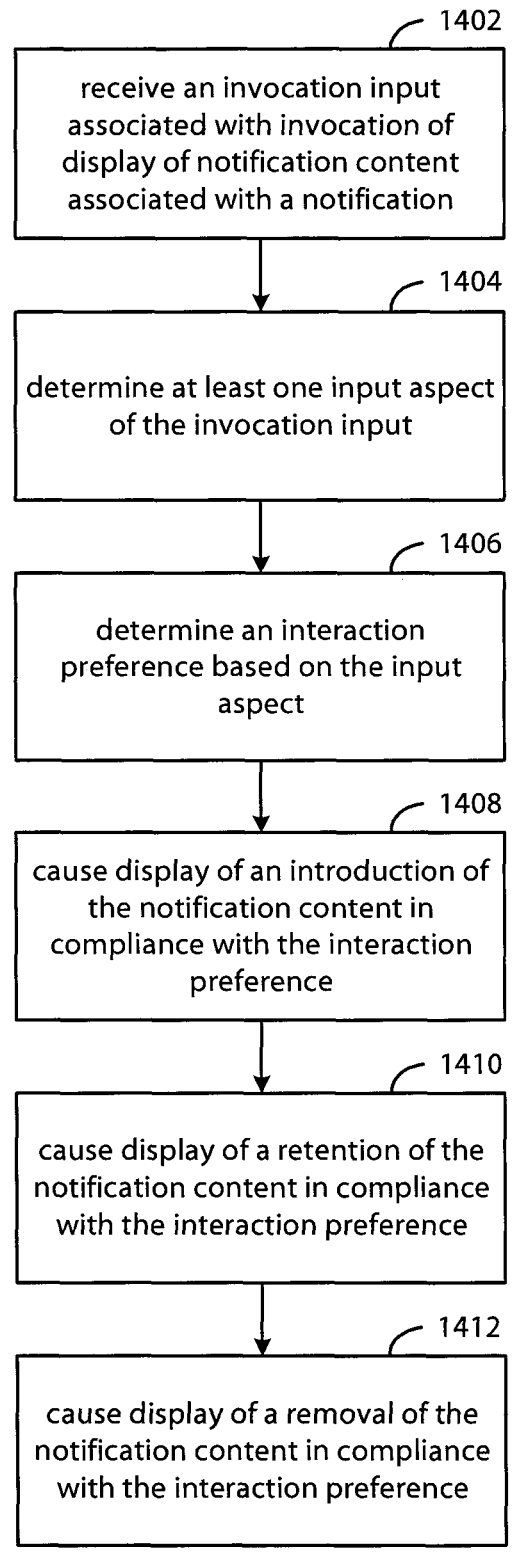
FIG. 14 is a flow diagram illustrating activities associated with causing display of notification content according to at least one example embodiment.

FIG. 14 is a flow diagram illustrating activities associated with causing display of notification content according to at least one example embodiment. In at least one example embodiment, there is a set of operations that corresponds the activities of FIG. 14. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 14.

At block 1402, the apparatus receives an indication of an invocation input associated with invocation of display of, at least part of, a notification content associated with a notification, similarly as described regarding block 1302 of FIG. 13. At block 1404, the apparatus determines at least one input aspect of the invocation input, similarly as described regarding block 1304 of FIG. 13. At block 1406, the apparatus determines an interaction preference based, at least in part, on the input aspect, similarly as described regarding block 1306 of FIG. 13.

At block 1408, the apparatus causes display of an introduction of the notification content in compliance with the interaction preference. The causation of display and the introduction may be similar as described regarding FIGS. 8A-8C.

At block 1410, the apparatus causes display of a retention of the notification content in compliance with the interaction preference. The causation of display and the retention may be similar as described regarding FIGS. 8A-8C.

At block 1412, the apparatus causes display of a removal of the notification content in compliance with the interaction preference. The causation of display and the removal may be similar as described regarding FIGS. 8A-8C.

Figure 15:
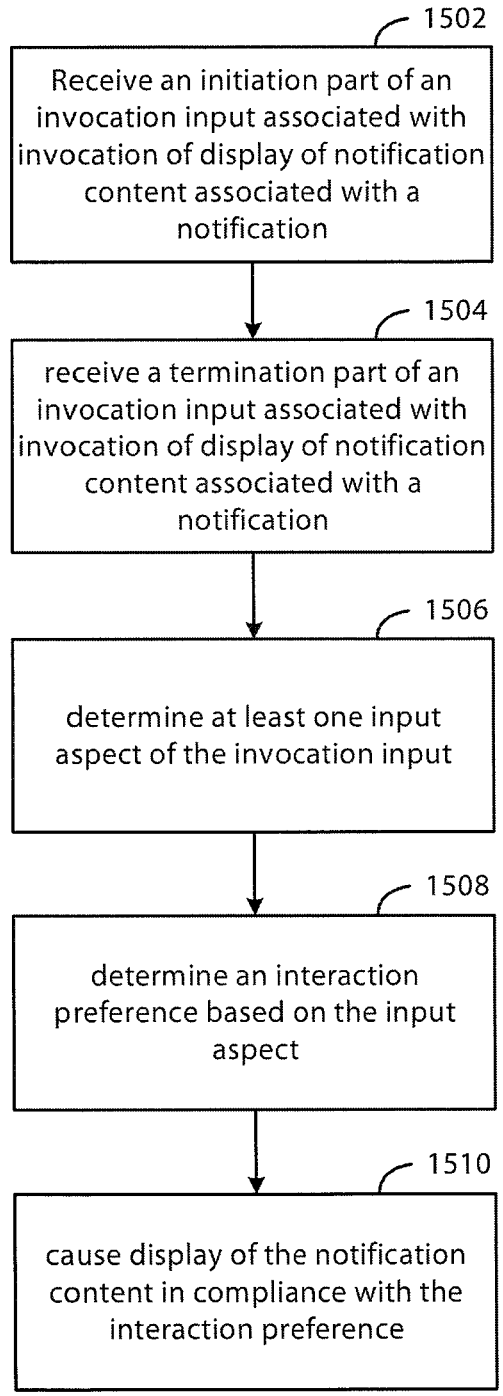
FIG. 15 is a flow diagram illustrating activities associated with causing display of notification content according to at least one example embodiment.

FIG. 15 is a flow diagram illustrating activities associated with causing display of notification content according to at least one example embodiment. In at least one example embodiment, there is a set of operations that corresponds the activities of FIG. 15. An apparatus, for example electronic apparatus 10 of FIG. 1, or a portion thereof; may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 15.

At block 1502, the apparatus receives an indication of an initiation part of an invocation input associated with invocation of display of, at least part of, a notification content associated with a notification. The receiving, the invocation input, the initiation part, the invocation of display, the notification, and the notification content may be similar as described regarding FIG. 6, FIGS. 8A-8C, and FIGS. 9A-9B.

At block 1504, the apparatus receives an indication of a termination part of an invocation input associated with invocation of display of; at least part of; a notification content associated with a notification. The receiving, the invocation input, the termination part, the invocation of display, the notification, and the notification content may be similar as described regarding FIG. 6, FIGS. 8A-8C, and FIGS. 9A-9B.

At block 1506, the apparatus determines at least one input aspect of the invocation input, similarly as described regarding block 1304 of FIG. 13. In at least one example embodiment, determination of the input aspect is performed after receipt of the termination part of the invocation input. At block 1508, the apparatus determines an interaction preference based, at least in part, on the input aspect, similarly as described regarding block 1306 of FIG. 13. In at least one example embodiment, determination of the interaction preference is performed after receipt of the termination part of the invocation input. At block 1510, the apparatus causes display of; at least part of; the notification content in compliance with the interaction preference, similarly as described regarding block 1308 of FIG. 13. In at least one example embodiment, causation of display of the notification content is performed after receipt of the termination part of the invocation input.

Figure 16:
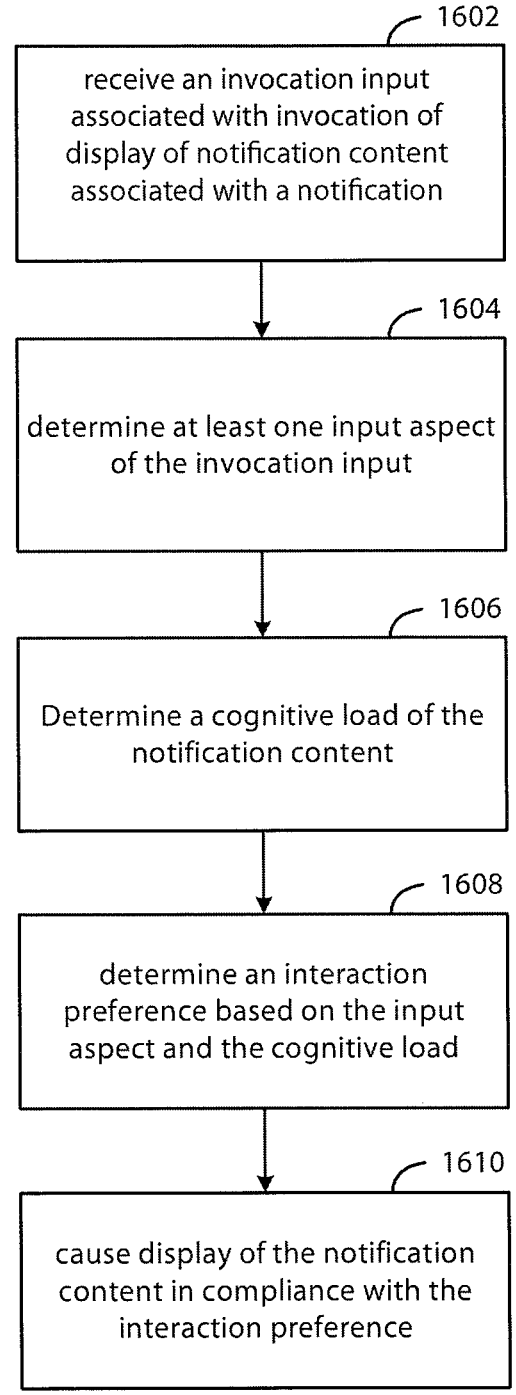
FIG. 16 is a flow diagram illustrating activities associated with causing display of notification content according to at least one example embodiment.

FIG. 16 is a flow diagram illustrating activities associated with causing display of notification content according to at least one example embodiment. In at least one example embodiment, there is a set of operations that corresponds the activities of FIG. 16. An apparatus, for example electronic apparatus 10 of FIG. 1, or a portion thereof; may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 16.

At block 1602, the apparatus receives an indication of an invocation input associated with invocation of display of, at least part of, a notification content associated with a notification, similarly as described regarding block 1302 of FIG. 13. At block 1604, the apparatus determines at least one input aspect of the invocation input, similarly as described regarding block 1304 of FIG. 13. At block 1606, the apparatus determines a cognitive load of the notification content. The determination and the cognitive load may be similar as described regarding FIG. 6. At block 1608, the apparatus determines an interaction preference based, at least in part, on the input aspect and the cognitive load. The determination and the interaction preference may be similar as described regarding FIGS. 8A-8C. At block 1610, the apparatus causes display of, at least part of, the notification content in compliance with the interaction preference, similarly as described regarding block 1308 of FIG. 13.

Figure 17:
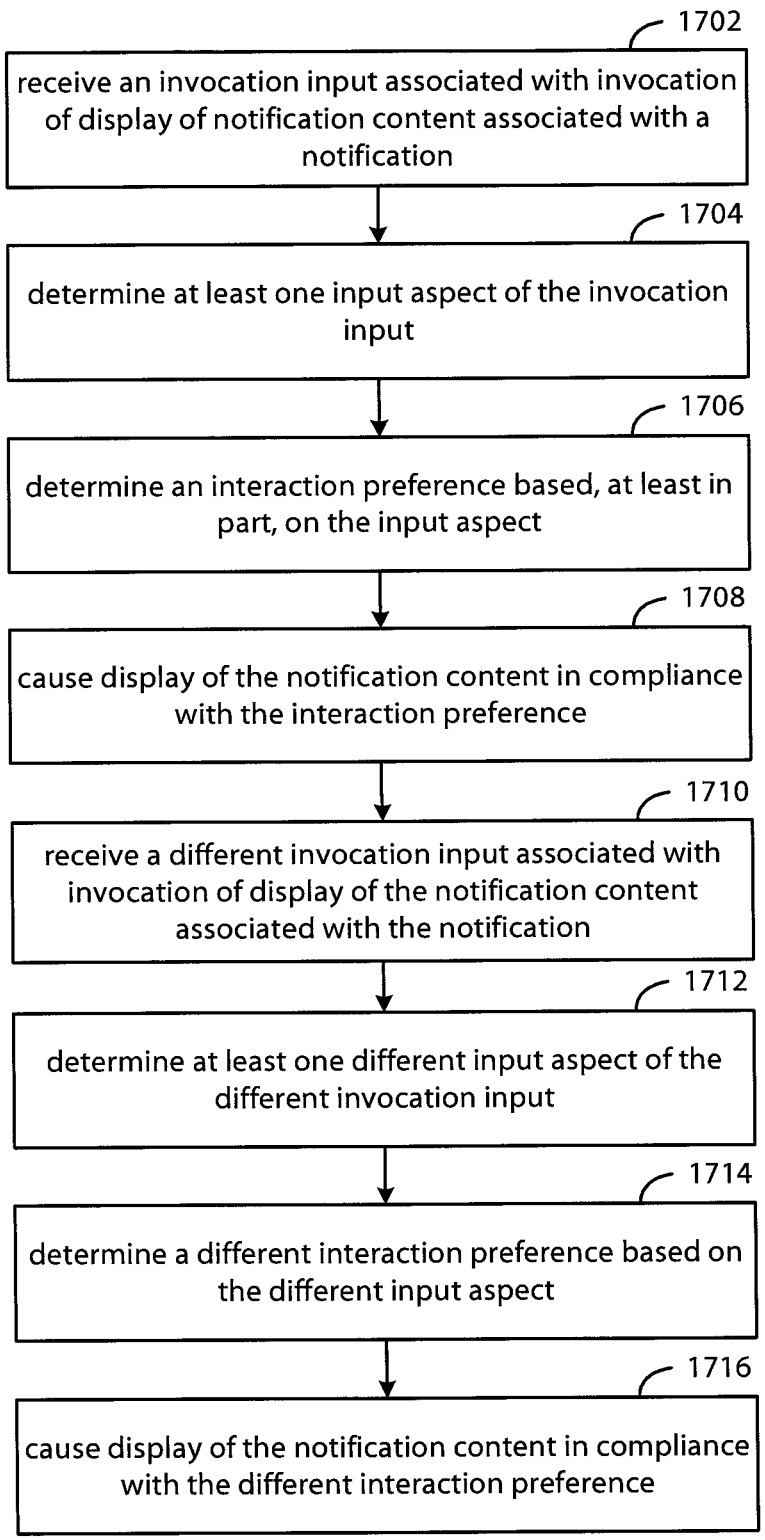
FIG. 17 is a flow diagram illustrating activities associated with causing display of notification content according to at least one example embodiment.

FIG. 17 is a flow diagram illustrating activities associated with causing display of notification content according to at least one example embodiment. In at least one example embodiment, there is a set of operations that corresponds the activities of FIG. 17. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 17.

At block 1702, the apparatus receives an indication of an invocation input associated with invocation of display of, at least part of, a notification content associated with a notification, similarly as described regarding block 1302 of FIG. 13. At block 1704, the apparatus determines at least one input aspect of the invocation input, similarly as described regarding block 1304 of FIG. 13. At block 1706, the apparatus determines an interaction preference based, at least in part, on the input aspect, similarly as described regarding block 1306 of FIG. 13. At block 1708, the apparatus causes display of, at least part of, the notification content in compliance with the interaction preference, similarly as described regarding block 1308 of FIG. 13.

At block 1710, the apparatus receives an indication of a different invocation input associated with invocation of display of, at least part of, the same notification content associated with the same notification. The receiving, the invocation input, the invocation of display, the notification, and the notification content may be similar as described regarding FIG. 6, FIGS. 8A-8C, and FIGS. 9A-9B.

At block 1712, the apparatus determines at least one different input aspect of the different invocation input. The determination and the input aspect may be similar as described regarding FIGS. 9A-9B.

At block 1714, the apparatus determines a different interaction preference based, at least in part, on the different input aspect. The determination and the interaction preference may be similar as described regarding FIGS. 8A-8C.

At block 1716, the apparatus causes display of, at least part of, the notification content in compliance with the different interaction preference. The causation of display, display of the notification content, and compliance with the interaction preference may be similar as described regarding FIG. 6 and FIGS. 8A-8C.

Figure 18:
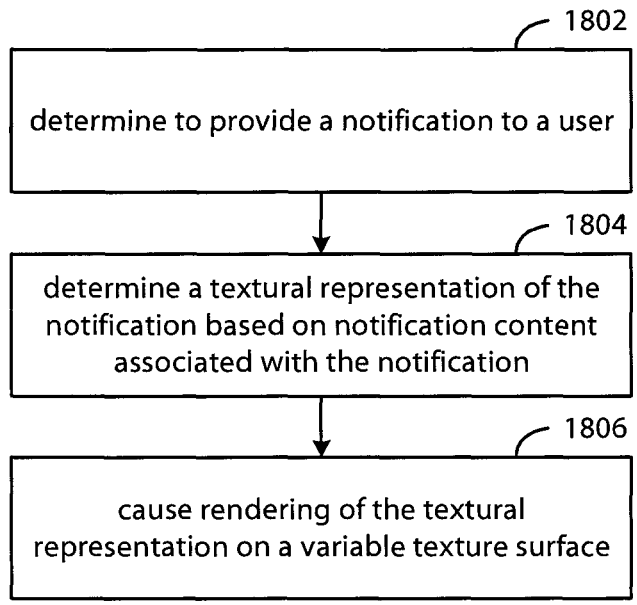
FIG. 18 is a flow diagram illustrating activities associated with a textural representation of a notification according to at least one example embodiment.

FIG. 18 is a flow diagram illustrating activities associated with a textural representation of a notification according to at least one example embodiment. In at least one example embodiment, there is a set of operations that corresponds the activities of FIG. 18. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 18.

At block 1802, the apparatus determines to provide a notification to a user. The determination, the provision, and the notification may be similar as described regarding FIG. 6.

At block 1804, the apparatus determines a textural representation of the notification based, at least in part, on notification content associated with the notification. The determination and the textural representation may be similar as described regarding FIGS. 12A-12C.

At block 1806, the apparatus causes rendering of the textural representation of the notification on a variable texture surface. The causation of rendering, the rendering, and the variable texture surface may be similar as described regarding FIGS. 3A-3D and FIGS. 12A-12C.

Figure 19:
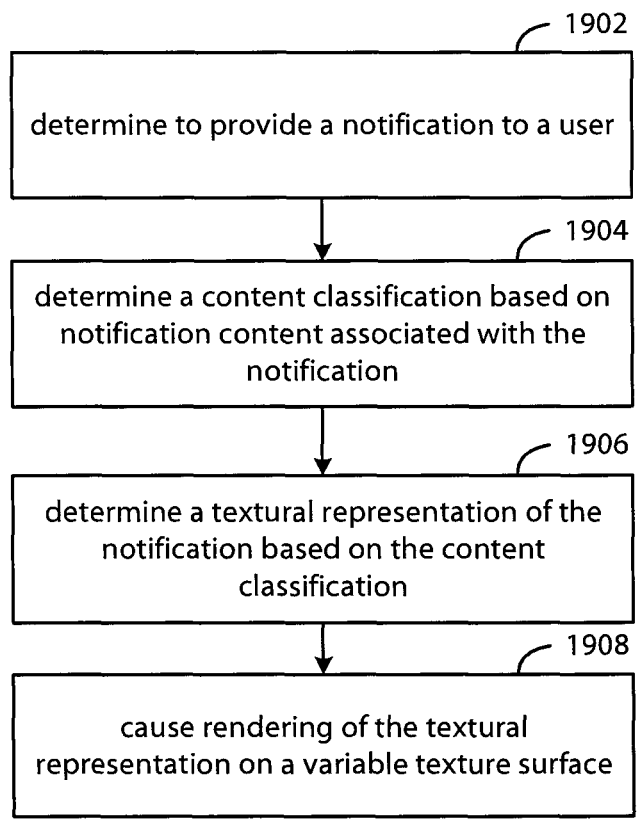
FIG. 19 is a flow diagram illustrating activities associated with a textural representation of a notification according to at least one example embodiment.

FIG. 19 is a flow diagram illustrating activities associated with a textural representation of a notification according to at least one example embodiment. In at least one example embodiment, there is a set of operations that corresponds the activities of FIG. 19. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 19.

At block 1902, the apparatus determines to provide a notification to a user, similarly as described regarding block 1802 of FIG. 18.

At block 1904, the apparatus determines at least one content classification associated with notification content associated with the notification. The determination and the content classification may be similar as described regarding FIG. 6.

At block 1906, the apparatus determines a textural representation of the notification based, at least in part, on the content classification. The determination and the textural representation may be similar as described regarding FIGS. 12A-12C.

At block 1908, the apparatus causes rendering of the textural representation of the notification on a variable texture surface, similarly as described regarding block 1806 of FIG. 18.

Figure 20:
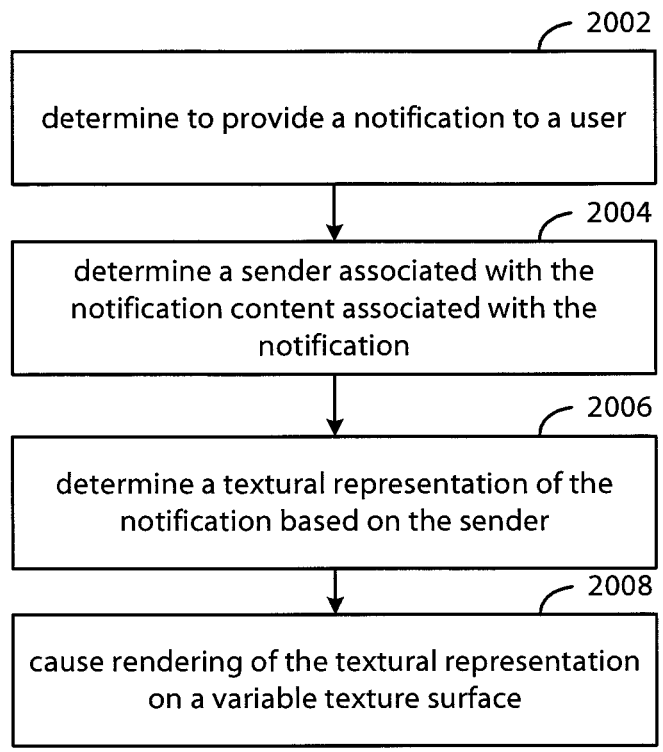
FIG. 20 is a flow diagram illustrating activities associated with a textural representation of a notification according to at least one example embodiment.

FIG. 20 is a flow diagram illustrating activities associated with a textural representation of a notification according to at least one example embodiment. In at least one example embodiment, there is a set of operations that corresponds the activities of FIG. 20. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 20.

At block 2002, the apparatus determines to provide a notification to a user, similarly as described regarding block 1802 of FIG. 18. At block 2004, the apparatus determines a sender associated with the notification content. The determination and the sender may be similar as described regarding FIG. 6. At block 2006, the apparatus determines a textural representation of the notification based, at least in part, on the sender. The determination and the textural representation may be similar as described regarding FIGS. 12A-12C.

At block 2008, the apparatus causes rendering of the textural representation of the notification on a variable texture surface, similarly as described regarding block 1806 of FIG. 18.

Figure 21:
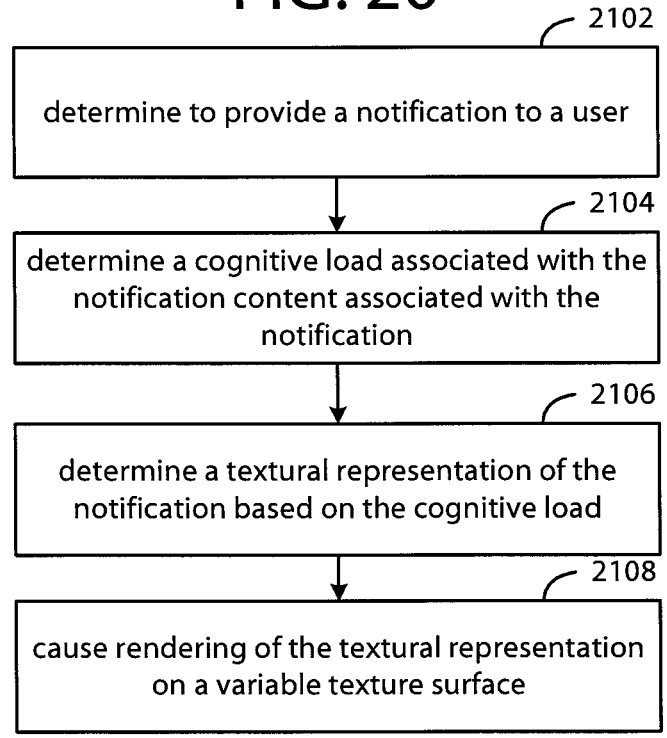
FIG. 21 is a flow diagram illustrating activities associated with a textural representation of a notification according to at least one example embodiment.

FIG. 21 is a flow diagram illustrating activities associated with a textural representation of a notification according to at least one example embodiment. In at least one example embodiment, there is a set of operations that corresponds the activities of FIG. 21. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 21.

At block 2102, the apparatus determines to provide a notification to a user, similarly as described regarding block 1802 of FIG. 18. At block 2104, the apparatus determines a cognitive load associated with the notification content, similarly as described regarding block 1606 of FIG. 16. At block 2106, the apparatus determines a textural representation of the notification based, at least in part, on the cognitive load. The determination and the textural representation may be similar as described regarding FIGS. 12A-12C. At block 2108, the apparatus causes rendering of the textural representation of the notification on a variable texture surface, similarly as described regarding block 1806 of FIG. 18.

Figure 22:
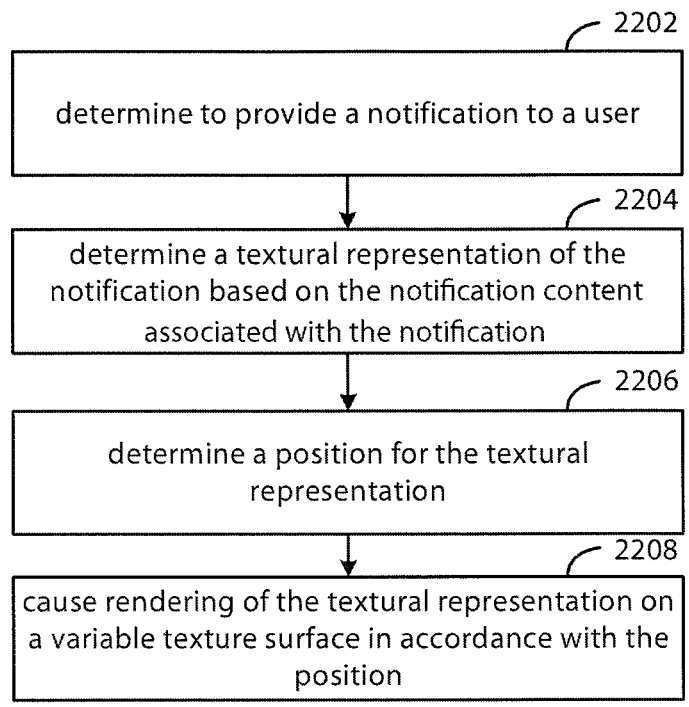
FIG. 22 is a flow diagram illustrating activities associated with a textural representation of a notification according to at least one example embodiment.

FIG. 22 is a flow diagram illustrating activities associated with a textural representation of a notification according to at least one example embodiment. In at least one example embodiment, there is a set of operations that corresponds the activities of FIG. 22. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 22.

At block 2202, the apparatus determines to provide a notification to a user, similarly as described regarding block 1802 of FIG. 18. At block 2204, the apparatus determines a textural representation of the notification based, at least in part, on notification content associated with the notification similarly as described regarding block 1804 of FIG. 18. At block 2206, the apparatus determines a position of the textural representation of the notification. The determination and the position may be similar as described regarding FIGS. 12A-12C. At block 2208, the apparatus causes rendering of the textural representation of the notification on a variable texture surface in accordance with the position. The causation of rendering, the rendering, accordance with the position, and the variable texture surface may be similar as described regarding FIGS. 3A-3D and FIGS. 12A-12C.

Figure 23:
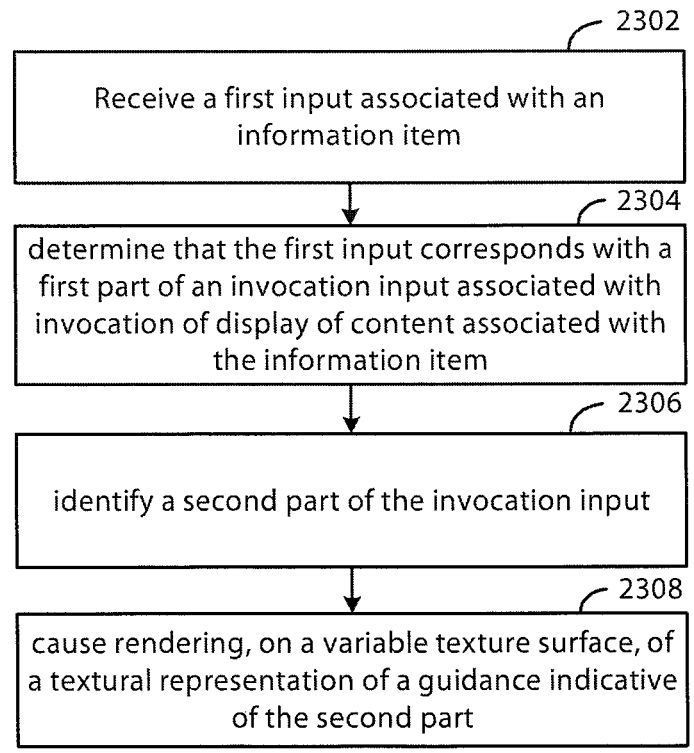
FIG. 23 is a flow diagram illustrating activities associated with a textural representation of a guidance according to at least one example embodiment.

FIG. 23 is a flow diagram illustrating activities associated with a textural representation of a guidance according to at least one example embodiment. In at least one example embodiment, there is a set of operations that corresponds the activities of FIG. 23. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 23.

At block 2302, the apparatus receives an indication of a first input associated with an information item. The receiving, the first input, and the information item may be similar as described regarding FIGS. 4A-4E, FIG. 6, and FIGS. 9A-9B.

At block 2304, the apparatus determines that the first input corresponds with a first part of an invocation input associated with invocation of display of, at least part of, content associated with the information item. The determination, the correspondence, the invocation input, and the part of the invocation input may be similar as described regarding FIGS. 9A-9B and FIGS. 12A-12C.

At block 2306, the apparatus identifies a second part of the invocation input, the second part of the invocation input. The identification and the second part of the invocation input may be similar as described regarding FIGS. 9A-9B and FIGS. 12A-12C.

At block 2308, the apparatus causes rendering, on a variable texture surface, of a textural representation of a guidance indicative of the second part of the invocation input. The rendering, the causation of rendering, the textural representation, and the guidance may be similar as described regarding FIGS. 3A-3D and FIGS. 12A-12C. In at least one example embodiment, block 2308 comprises determining the guidance based, at least in part, on the second part of the invocation input, similarly as described regarding FIGS. 12A-12C. In at least one example embodiment, block 2308 comprises determining the textural representation of the guidance, similarly as described regarding FIGS. 12A-12C.

Figure 24:
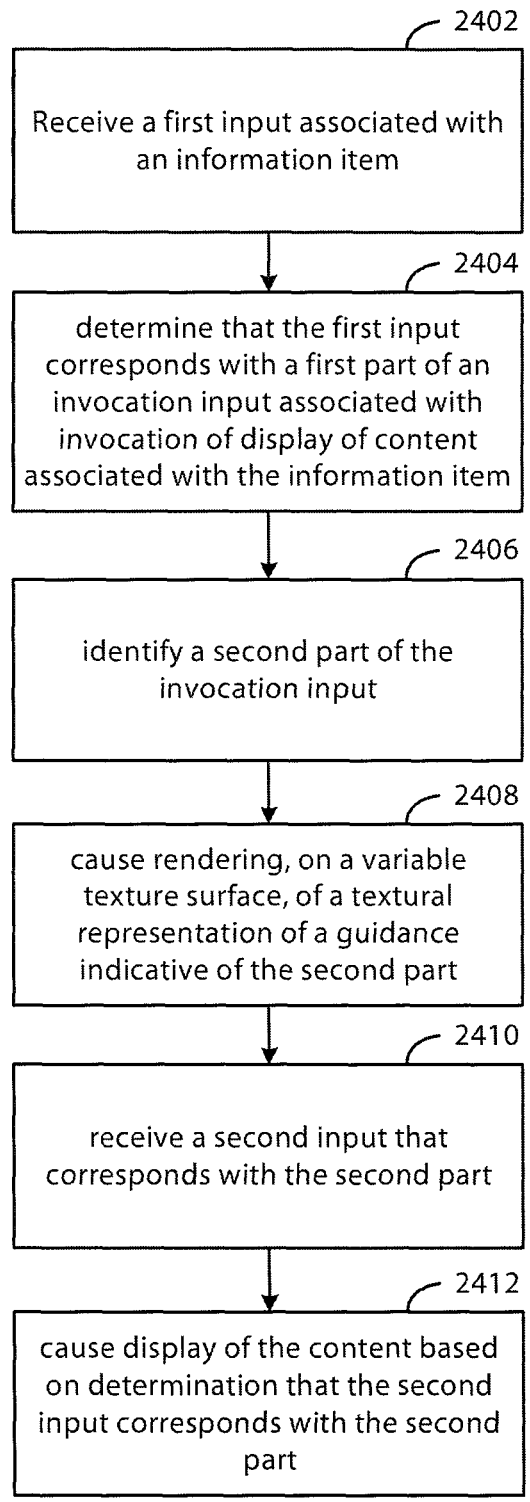
FIG. 24 is a flow diagram illustrating activities associated with a textural representation of a guidance according to at least one example embodiment.

FIG. 24 is a flow diagram illustrating activities associated with a textural representation of a guidance according to at least one example embodiment. In at least one example embodiment, there is a set of operations that corresponds the activities of FIG. 24. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 24.

At block 2402, the apparatus receives an indication of a first input associated with an information item, similarly as described regarding block 2302 of FIG. 23. At block 2404, the apparatus determines that the first input corresponds with a first part of an invocation input associated with invocation of display of, at least part of, content associated with the information item, similarly as described regarding block 2304 of FIG. 23. At block 2406, the apparatus identifies a second part of the invocation input, the second part of the invocation input, similarly as described regarding block 2306 of FIG. 23. At block 2408, the apparatus causes rendering, on a variable texture surface, of a textural representation of a guidance indicative of the second part of the invocation input, similarly as described, similarly as described regarding block 2308 of FIG. 23.

At block 2410, the apparatus receives an indication of a second input that corresponds with the second part of the invocation input. The second input and correspondence with the second part of the invocation input may be similar as described regarding FIGS. 4A-4E, FIG. 6, FIGS. 9A-9B, and FIGS. 12A-12C.

At block 2412, the apparatus causes display of the content based, at least in part, on determination that the second input corresponds with the second part of the invocation input. The causation of display and the determination may be similar as described regarding FIG. 6, FIGS. 8A-8C, and FIGS. 9A-9B.

Figure 25:
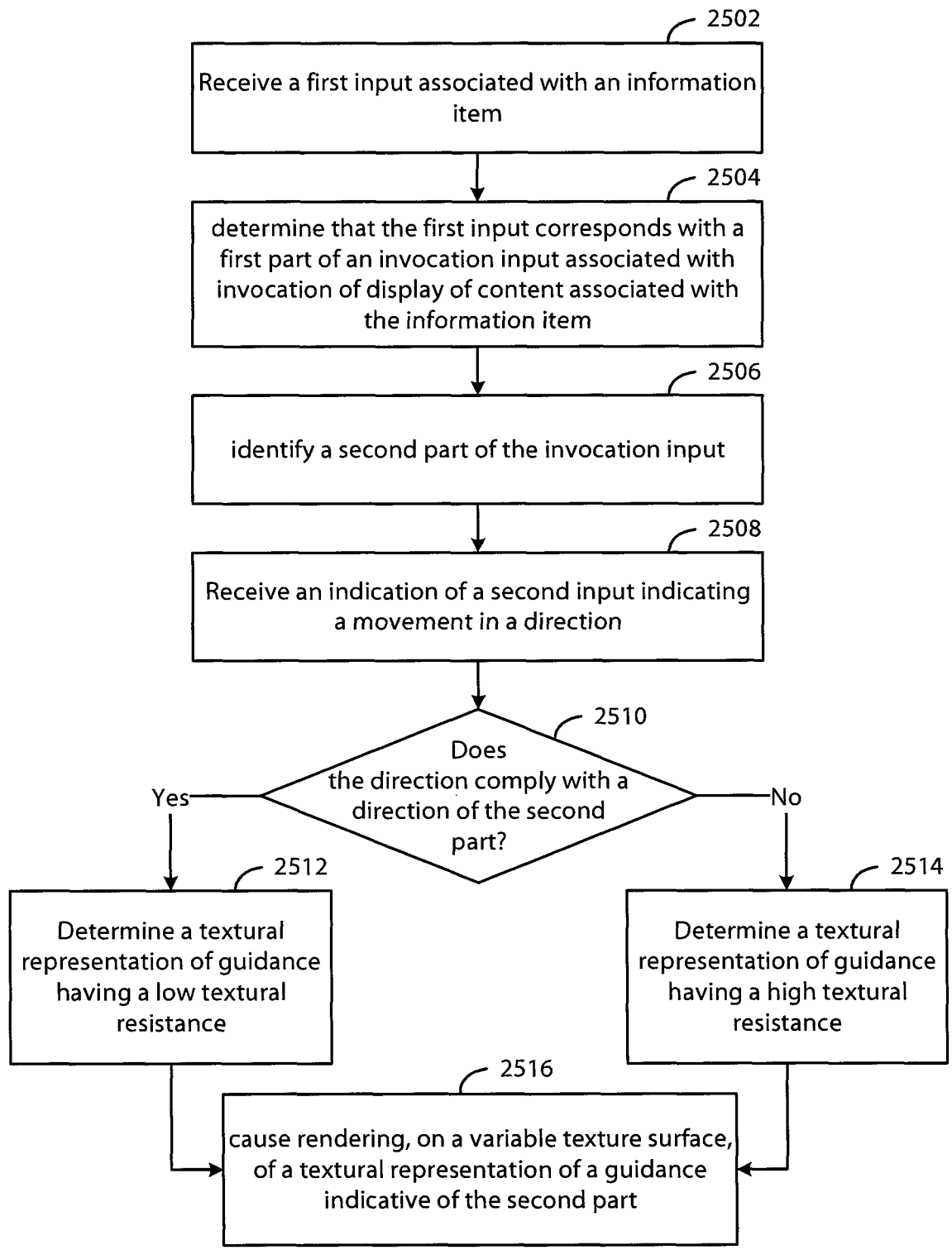
FIG. 25 is a flow diagram illustrating activities associated with a textural representation of a guidance according to at least one example embodiment.

FIG. 25 is a flow diagram illustrating activities associated with a textural representation of a guidance according to at least one example embodiment. In at least one example embodiment, there is a set of operations that corresponds the activities of FIG. 25. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 25.

At block 2502, the apparatus receives an indication of a first input associated with an information item, similarly as described regarding block 2302 of FIG. 23. At block 2504, the apparatus determines that the first input corresponds with a first part of an invocation input associated with invocation of display of, at least part of, content associated with the information item, similarly as described regarding block 2304 of FIG. 23. At block 2506, the apparatus identifies a second part of the invocation input, the second part of the invocation input, similarly as described regarding block 2306 of FIG. 23. At block 2508, the apparatus receives an indication of a second input that indicates a movement in a direction. The second input may be similar as described regarding FIGS. 4A-4E, FIG. 6, and FIGS. 9A-9B.

At block 2510, the apparatus determines whether the direction complies with a direction of the second part of the invocation input. The determination and the compliance may be similar as described regarding FIGS. 12A-12C. If the apparatus determines that the direction complies with a direction of the second part of the invocation input, flow proceeds to block 2512. If the apparatus determines that the direction fails to comply with the direction of the second part of the invocation input, flow proceeds to block 2514.

At block 2512, the apparatus determines a textural representation of guidance having a low textural resistance. The textural representation and low textural resistance may be similar as described FIGS. 3A-3D and FIGS. 12A-12C.

At block 2514, the apparatus determines a textural representation of guidance having a high textural resistance. The textural representation and high textural resistance may be similar as described FIGS. 3A-3D and FIGS. 12A-12C.

At block 2516, the apparatus causes rendering, on a variable texture surface, of a textural representation of a guidance indicative of the second part of the invocation input, similarly as described regarding, similarly as described regarding block 2308 of FIG. 23.

It should be understood that the terms low and high as applied to this example are merely provided for purposes of differentiation relative to each other. Low and high are not intended to be provided as terms for quantification. For example, a low textural resistant relates to a textural resistance that is lower than the high textural resistance and a high textural resistant relates to a textural resistance that is higher than the low textural resistance.

Figure 26:
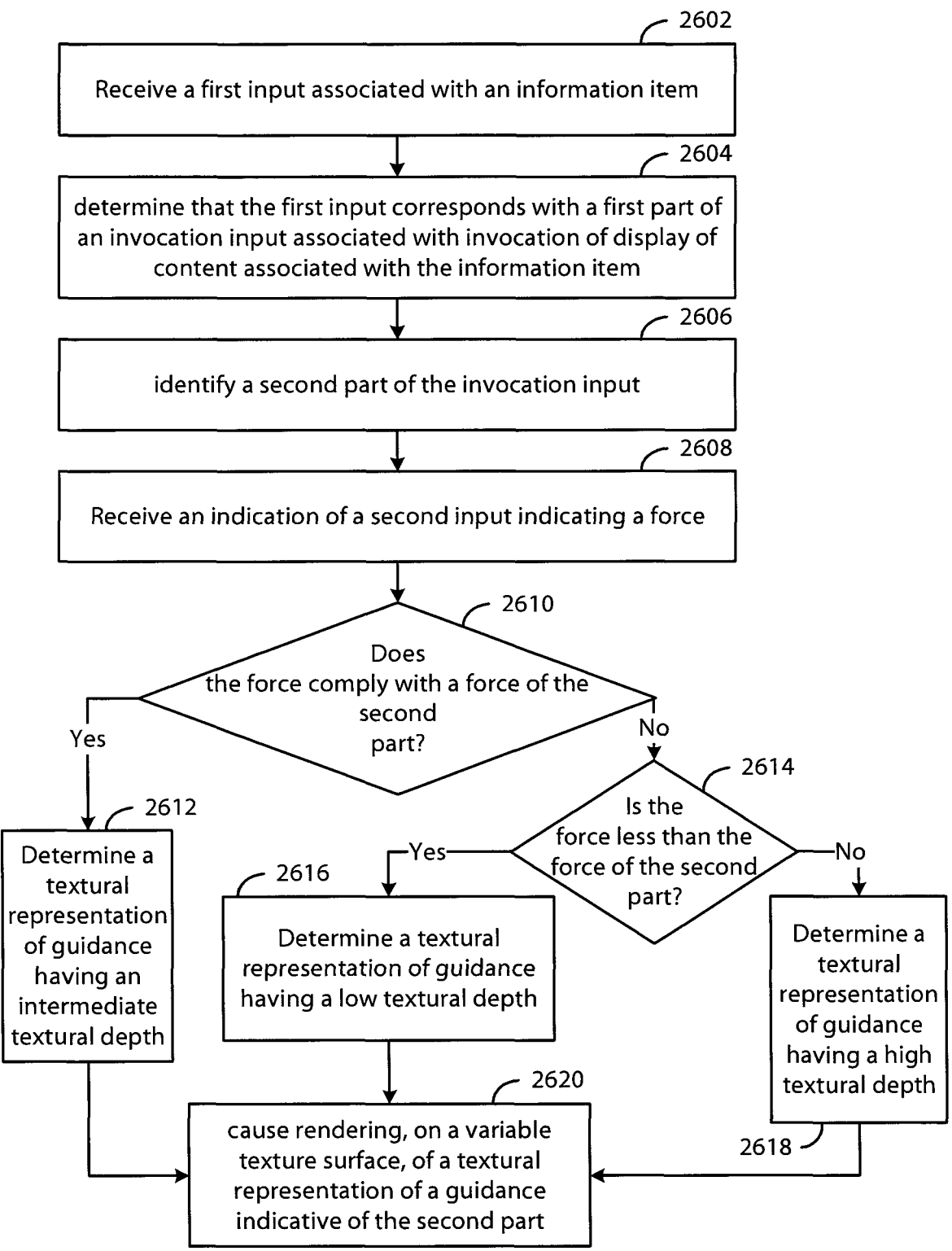
FIG. 26 is a flow diagram illustrating activities associated with a textural representation of a guidance according to at least one example embodiment.

FIG. 26 is a flow diagram illustrating activities associated with a textural representation of a guidance according to at least one example embodiment. In at least one example embodiment, there is a set of operations that corresponds the activities of FIG. 26. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 26.

At block 2602, the apparatus receives an indication of a first input associated with an information item, similarly as described regarding block 2302 of FIG. 23. At block 2604, the apparatus determines that the first input corresponds with a first part of an invocation input associated with invocation of display of, at least part of, content associated with the information item, similarly as described regarding block 2304 of FIG. 23. At block 2606, the apparatus identifies a second part of the invocation input, the second part of the invocation input, similarly as described regarding block 2306 of FIG. 23. At block 2608, the apparatus receives an indication of a second input that indicates a force. The second input may be similar as described regarding FIG. 6, and FIGS. 9A-9B.

At block 2610, the apparatus determines whether the force complies with a force of the second part of the invocation input. The determination and the compliance may be similar as described regarding FIGS. 12A-12C. If the apparatus determines that the force complies with a force of the second part of the invocation input, flow proceeds to block 2612. If the apparatus determines that the force fails to comply with the force of the second part of the invocation input, flow proceeds to block 2614.

At block 2612, the apparatus determines a textural representation of guidance having an intermediate textural depth. The textural representation and intermediate textural depth may be similar as described FIGS. 3A-3D and FIGS. 12A-12C. Flow proceeds to block 2620.

At block 2614, the apparatus determines whether the force is less than the force of the second part of the invocation input. If the apparatus determines that the force is less than the force of the second part of the invocation input, flow proceeds to block 2616. If the apparatus determines that the force is not less than the force of the second part of the invocation input, flow proceeds to block 2618.

At block 2616, the apparatus determines a textural representation of guidance having a low textural depth. The textural representation and low textural depth may be similar as described FIGS. 3A-3D and FIGS. 12A-12C. Flow proceeds to block 2620.

At block 2618, the apparatus determines a textural representation of guidance having a high textural depth. The textural representation and high textural depth may be similar as described FIGS. 3A-3D and FIGS. 12A-12C. Flow proceeds to block 2620.

At block 2620, the apparatus causes rendering, on a variable texture surface, of a textural representation of a guidance indicative of the second part of the invocation input, similarly as described regarding, similarly as described regarding block 2308 of FIG. 23.

It should be understood that the terms low, intermediate, and high as applied to this example are merely provided for purposes of differentiation relative to each other. Low, intermediate, and high are not intended to be provided as terms for quantification. For example, a low textural depth relates to a textural depth that is lower than the intermediate textural depth, an intermediate textural depth relates to a textural depth that is higher than the low textural depth and lower than the high textural depth, and a high textural depth relates to a textural depth that is higher than the intermediate textural depth.

Figure 27:
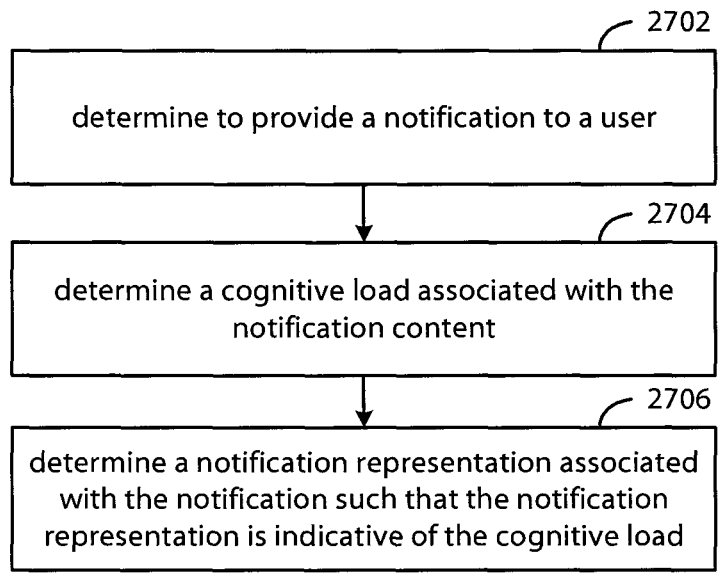
FIG. 27 is a flow diagram illustrating activities associated with a notification representation indicative of a cognitive load according to at least one example embodiment.

FIG. 27 is a flow diagram illustrating activities associated with a notification representation indicative of a cognitive load according to at least one example embodiment. In at least one example embodiment, there is a set of operations that corresponds the activities of FIG. 27. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 27.

At block 2702, the apparatus determines to provide a notification to a user, similarly as described regarding block 1802 of FIG. 18.

At block 2704, the apparatus determines a cognitive load associated with the notification content, similarly as described regarding block 1606 of FIG. 16.

At block 2706, the apparatus determines a notification representation associated with the notification such that the notification representation is indicative of the cognitive load. The determination, the notification representation, and the indication of the cognitive load may be similar as described regarding FIG. 6 and FIGS. 7A-7E.

Figure 28:
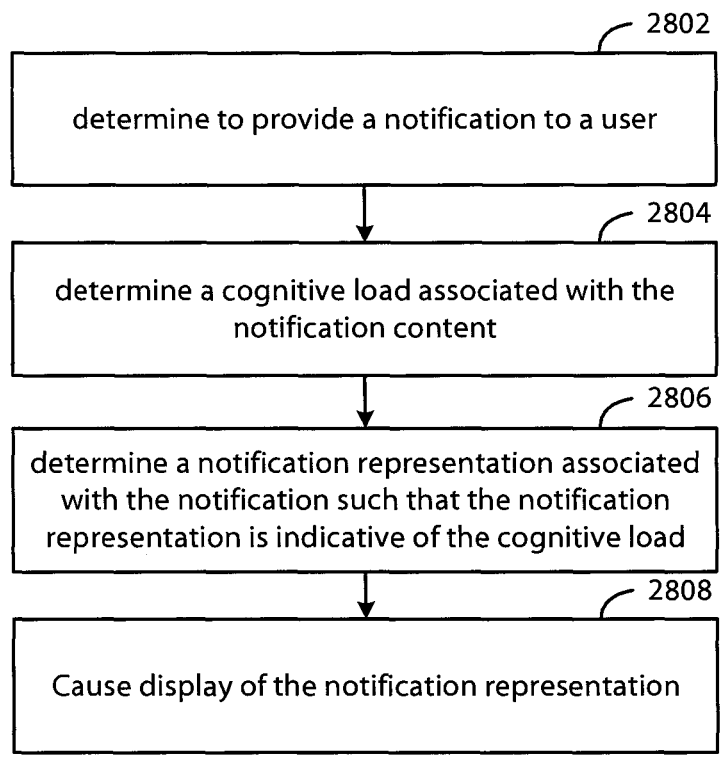
FIG. 28 is a flow diagram illustrating activities associated with a notification representation indicative of a cognitive load according to at least one example embodiment.

FIG. 28 is a flow diagram illustrating activities associated with a notification representation indicative of a cognitive load according to at least one example embodiment. In at least one example embodiment, there is a set of operations that corresponds the activities of FIG. 28. An apparatus, for example electronic apparatus 10 of FIG. 1, or a portion thereof; may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 28.

At block 2802, the apparatus determines to provide a notification to a user, similarly as described regarding block 1802 of FIG. 18. At block 2804, the apparatus determines a cognitive load associated with the notification content, similarly as described regarding block 1606 of FIG. 16. At block 2806, the apparatus determines a notification representation associated with the notification such that the notification representation is indicative of the cognitive load, similarly as described regarding block 2706 of FIG. 27. At block 2808, the apparatus causes display of the notification representation on a display. The causation of display may be similar as described regarding FIG. 6 and FIGS. 7A-7E.

Figure 29:
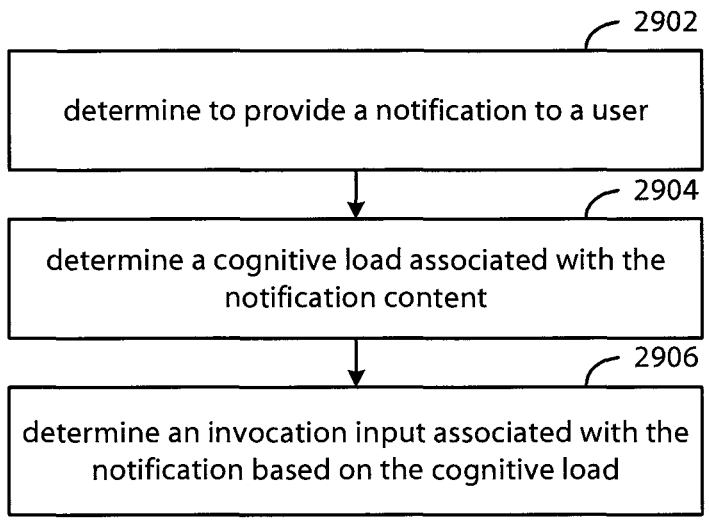
FIG. 29 is a flow diagram illustrating activities associated with an invocation input associated with a cognitive load according to at least one example embodiment.

FIG. 29 is a flow diagram illustrating activities associated with an invocation input associated with a cognitive load according to at least one example embodiment. In at least one example embodiment, there is a set of operations that corresponds the activities of FIG. 29. An apparatus, for example electronic apparatus 10 of FIG. 1, or a portion thereof may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 29.

At block 2902, the apparatus determines to provide a notification to a user, similarly as described regarding block 1802 of FIG. 18. At block 2904, the apparatus determines a cognitive load associated with the notification content, similarly as described regarding block 1606 of FIG. 16.

At block 2906, the apparatus determines an invocation input associated with the notification based, at least in part on the cognitive load. The determination and the invocation input may be similar as described regarding FIG. 6 and FIGS. 9A-9B.

Figure 30:
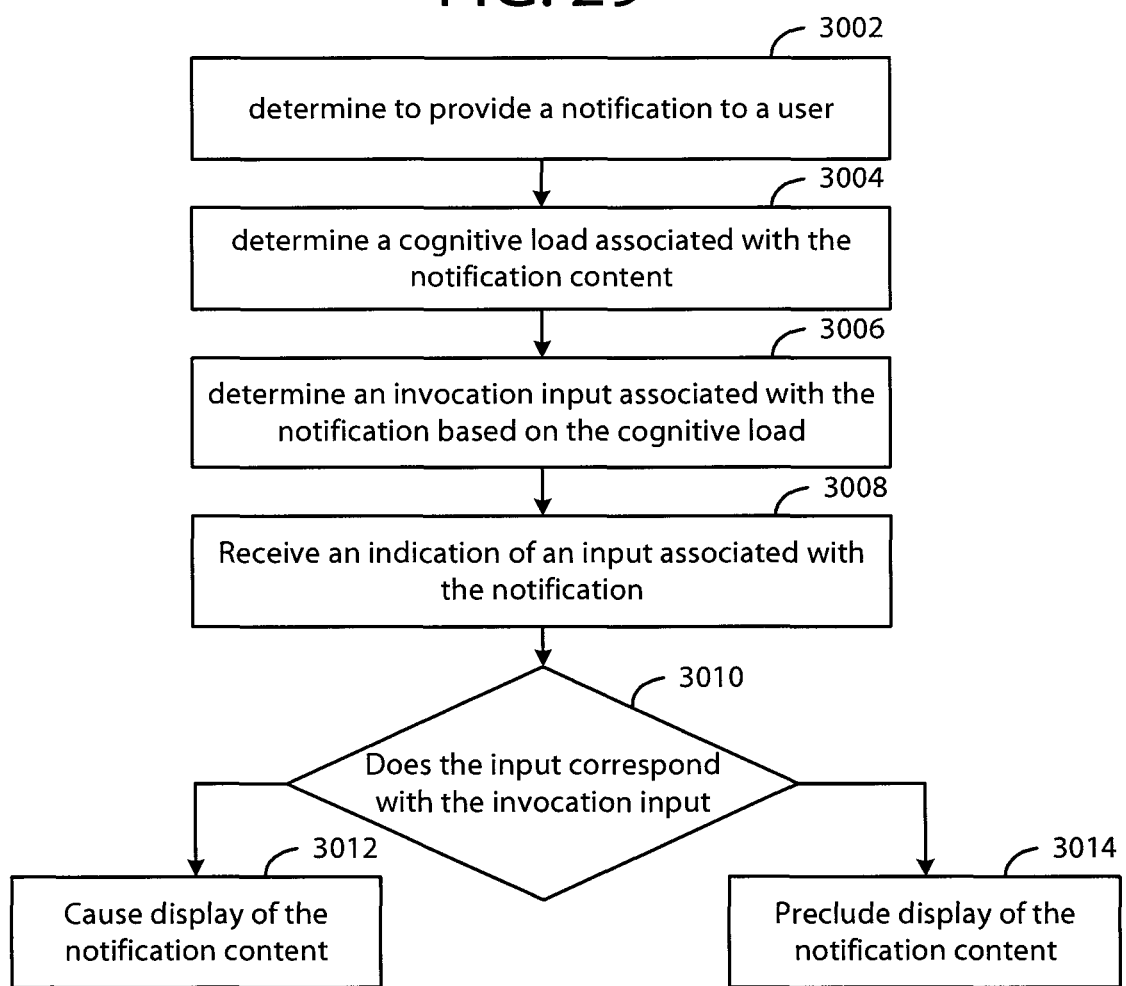
FIG. 30 is a flow diagram illustrating activities associated with an invocation input associated with a cognitive load according to at least one example embodiment.

FIG. 30 is a flow diagram illustrating activities associated with an invocation input associated with a cognitive load according to at least one example embodiment. In at least one example embodiment, there is a set of operations that corresponds the activities of FIG. 30. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 30.

At block 3002, the apparatus the apparatus determines to provide a notification to a user, similarly as described regarding block 1802 of FIG. 18. At block 3004, the apparatus determines a cognitive load associated with the notification content, similarly as described regarding block 1606 of FIG. 16. At block 3006, the apparatus determines an invocation input associated with the notification based, at least in part on the cognitive load, similarly as described regarding block 2906 of FIG. 29.

At block 3008, the apparatus receiving an indication of an input associated with the notification. The input and the association with the notification may be similar as described regarding FIGS. 4A-4E and FIGS. 9A-9B.

At block 3010, the apparatus determines whether the input corresponds with, at least part of, the invocation input. The determination and the correspondence may be similar as described regarding FIGS. 9A-9B. If the apparatus determines that the input corresponds with, at least part of, the invocation input, flow proceeds to block 3012. If the apparatus determines that the input fails to correspond with, at least part of, the invocation input, flow proceeds to block 3014.

At block 3012, the apparatus causes display of, at least part of, the notification content. The causation of display may be similar as described regarding FIG. 6 and FIGS. 8A-8C. In this manner, causation of display of, at least part of, the notification content may be based, at least in part, on determination that the input corresponds with the invocation input.

At block 3014, the apparatus precludes display of the notification content. For example, causation of display of, at least part of, the notification content may be predicated upon determination that the input corresponds with the invocation input.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1604 of FIG. 16 may be performed after block 1606. Furthermore, if desired, one or more of the above-described functions may be optional or may be combined. For example, blocks 1712, 1714, and 1716 of FIG. 17 may be optional and/or combined with block 1610 of FIG. 16.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. A method comprising:
   transmitting a first signal to a display of an apparatus, where the display is at least part of a virtual or augmented reality device configured to be worn by a user with the display located in front of at least one eye of the user, where the first signal comprises notification content of a notification to the user to be visually displayed on the display, wherein the notification is configured to indicate a cognitive load of the notification content;
   receiving an input from the user in regard to the notification content visually displayed on the display;
   identifying the input from the user as at least one recognizable response, of a plurality of predetermined recognizable responses, to the notification; and
   transmitting a second signal to a textural feedback device, where the second signal is configured to at least partially instruct the textural feedback device to provide textural feedback to the user, where the second signal is, at least partially, based upon:
   the notification,
   the cognitive load of the notification content, wherein at least one of a texture size, a texture magnitude, or a texture type of the textural feedback provided according to the second signal is based, at least partially, on the cognitive load, and the input received from the user in regard to the notification content visually displayed on the display of the virtual or augmented reality device worn by the user.

2. A method as in claim 1 further comprising displaying the notification to the user on the display, where the plurality of predetermined recognizable responses comprises a plurality of gestures the user can perform with a user input device as the input from the user, where the plurality of gestures are configured to cause the notification content to be displayed differently in the notification on the display when a respective one of the plurality of gestures is identified as the input.

3. A method as in claim 2 where the receiving of the input from the user comprises receiving an indication of a first part of the input from the user on a variable texture surface.

4. A method as in claim 3 where the variable texture surface is on the textural feedback device.

5. A method as in claim 3 further comprising determining that the user is attempting to perform only a first gesture of at least two of the plurality of gestures based on a subsequent part of the input of the user corresponding to a subsequent part of only the first gesture.

6. A method as in claim 3 where the transmitting of the second signal to the textural feedback device is configured to cause a textural resistance at the textural feedback device related to a representation of a friction, and where the second signal is configured to have the variable texture surface convey the representation of the friction to the user based on at least one of:
manipulating a rheological fluid;
varying a depth of at least one part of the variable texture surface differently than at least one other part of the variable texture surface;
varying an electric field; or
varying a temperature.

7. A method as in claim 1, wherein the textural feedback is configured to indicate information about the notification content to the user and is configured to enable the user to maintain visual attention to a scene displayed on the display.

8. An apparatus, comprising:
at least one processor;
at least one non-transitory memory including a computer program code, where the at least one memory and the computer program code are configured to, working with the at least one processor, cause the apparatus to perform at least the following:
cause transmitting of a first signal to a display of a virtual or augmented reality device, where the display is at least part of the virtual or augmented reality device configured to be worn by a user with the display located in front of at least one eye of the user, where the first signal comprises notification content of a notification to the user to be visually displayed on the display, wherein the notification is configured to indicate a cognitive load of the notification content;
allow receiving an input from the user in regard to the notification content visually displayed on the display;
identify the input from the user as at least one recognizable response, of a plurality of predetermined recognizable responses, to the notification; and
cause transmitting of a second signal to a textural feedback device, where the second signal is configured to at least partially instruct the textural feedback device to provide textural feedback to the user, where the second signal is, at least partially, based upon:
the notification,
the cognitive load of the notification content, wherein at least one of a texture size, a texture magnitude, or a texture type of the textural feedback provided according to the second signal is based, at least partially, on the cognitive load, and
the input received from the user in regard to the notification content visually displayed on the display of the virtual or augmented reality device worn by the user.

9. An apparatus as in claim 8 where the at least one memory and the computer program code are configured to, working with the at least one processor, cause the apparatus to display the notification to the user on the display, where the plurality of predetermined recognizable responses comprises a plurality of gestures the user can perform with a user input device as the input from the user, where the plurality of gestures are configured to cause the notification content to be displayed differently in the notification on the display when a respective one of the plurality of gestures is identified as the input.

10. An apparatus as in claim 9 where the receiving of the input from the user comprises allowing receiving of an indication of a first part of the input from the user on a variable texture surface.

11. An apparatus as in claim 10 where the variable texture surface is on the textural feedback device.

12. An apparatus as in claim 10 where the at least one memory and the computer program code are configured to, working with the at least one processor, cause the apparatus to determine that the user is attempting to perform only a first gesture of at least two of the plurality of gestures based on a subsequent part of the input of the user corresponding to a subsequent part of only the first gesture.

13. An apparatus as in claim 10 where the transmitting of the second signal to the textural feedback device is configured to cause a textural resistance at the textural feedback device related to a representation of a friction, and where the second signal is configured to have the variable texture surface convey the representation of the friction to the user based on at least one of:
manipulating a rheological fluid;
varying a depth of at least one part of the variable texture surface differently than at least one other part of the variable texture surface;
varying an electric field; or
varying a temperature.

14. An apparatus as in claim 8, wherein the textural feedback is configured to indicate information about the notification content to the user and is configured to enable the user to maintain visual attention to a scene displayed on the display.

15. An non-transitory computer-readable medium encoded with instructions that, when executed with an apparatus, causes the apparatus to perform:
transmitting a first signal to a display of the apparatus, where the display is at least part of a virtual or augmented reality device configured to be worn by a user with the display located in front of at least one eye of the user, where the first signal comprises notification content of a notification to the user to be visually displayed on the display, wherein the notification is configured to indicate a cognitive load of the notification content;
receiving an input from the user in regard to the notification content visually displayed on the display;

identifying the input from the user as at least one recognizable response, of a plurality of predetermined recognizable responses, to the notification; and transmitting a second signal to a textural feedback device, where the second signal is configured to at least partially instruct the textural feedback device to provide textural feedback to the user, where the second signal is, at least partially, based upon:

the notification, the cognitive load of the notification content, wherein at least one of a texture size, a texture magnitude, or a texture type of the textural feedback provided according to the second signal is based, at least partially, on the cognitive load, and the input received from the user in regard to the notification content visually displayed on the display of the virtual or augmented reality device worn by the user.

16. A non-transitory computer-readable medium as in claim 15 where the instructions, when executed by the apparatus, causes the apparatus to display the notification to the user on the display, where the plurality of predetermined recognizable responses comprises a plurality of gestures the user can perform with a user input device as the input from the user, where the plurality of gestures are configured to cause the notification content to be displayed differently in the notification on the display when a respective one of the plurality of gestures is identified as the input.

17. A non-transitory computer-readable medium as in claim 16 where the receiving of the input from the user comprises receiving an indication of a first part of the input from the user on a variable texture surface.

18. A non-transitory computer-readable medium as in claim 17 where the variable texture surface is on the textural feedback device.

19. A non-transitory computer-readable medium as in claim 17 where the instructions, when executed by the apparatus, causes the apparatus to determine that the user is attempting to perform only a first gesture of at least two of the plurality of gestures based on a subsequent part of the input of the user corresponding to a subsequent part of only the first gesture.

20. A non-transitory computer-readable medium as in claim 17 where the instructions, when executed by the apparatus, causes the apparatus to cause a textural resistance at the textural feedback device related to a representation of a friction, and where the second signal is configured to have the variable texture surface convey the representation of the friction to the user based on at least one of:

manipulating a rheological fluid;

varying a depth of at least one part of the variable texture surface differently than at least one other part of the variable texture surface;

varying an electric field; or varying a temperature.

* * * * *